United States Patent [19]
Sudo et al.

[11] Patent Number: 5,272,536
[45] Date of Patent: Dec. 21, 1993

[54] DARK CURRENT AND DEFECTIVE PIXEL CORRECTION APPARATUS

[75] Inventors: Fumihiko Sudo; Takashi Asaida, both of Kanagawa, Japan

[73] Assignee: Sony Corporation, Tokyo, Japan

[21] Appl. No.: 668,251

[22] Filed: Mar. 12, 1991

[30] Foreign Application Priority Data

Mar. 13, 1990 [JP] Japan .................. 2-059968
Mar. 13, 1990 [JP] Japan .................. 2-059970

[51] Int. Cl.$^5$ .......................................... H04N 5/335
[52] U.S. Cl. .................. 358/213.15; 358/213.16; 358/213.17
[58] Field of Search .............. 358/213.16, 213.17, 358/213.15, 163, 221, 461

[56] References Cited

U.S. PATENT DOCUMENTS

| | | | |
|---|---|---|---|
| 4,216,503 | 8/1980 | Wiggins | 358/213.16 X |
| 4,240,103 | 12/1980 | Poetsch . | |
| 4,562,459 | 12/1985 | Sokei . | |
| 4,590,520 | 5/1986 | Frame et al. | 358/163 |
| 4,602,291 | 7/1986 | Temes | 358/213.17 X |
| 4,628,352 | 12/1986 | Boue . | |
| 4,701,784 | 10/1987 | Matsuoka et al. | 358/213.17 |
| 4,912,558 | 3/1990 | Easterly et al. | 358/213.16 |
| 5,047,863 | 9/1991 | Pape et al. | 358/213.16 |
| 5,113,246 | 5/1992 | Ninomiya et al. | 358/163 X |
| 5,132,801 | 7/1992 | Yamano | 358/213.16 |

FOREIGN PATENT DOCUMENTS

2538544 3/1976 Fed. Rep. of Germany .

*Primary Examiner*—Mark R. Powell
*Attorney, Agent, or Firm*—Hill, Steadman & Simpson

[57] ABSTRACT

A dark current correction apparatus eliminates a dark current signal component or components from an output signal of an imaging device having an array of pixels. The apparatus includes an A/D converter for digitizing the output signal, and a memory for storing level data of the digitized signal while exposure of the imaging device is controlled to be at a zero level or a uniformly illuminated level, according to whether dark current correction or white current correction, respectively, is to be performed. A dark current correction signal former generates a dark current correction signal or signals from data read out from the memory. The dark current correction signal or signals are applied to a correction circuit which processes an output signal produced by the imaging device during normal imaging operation in accordance with the correction signal or signals in order to eliminate the dark current signal component or components from that output signal.

10 Claims, 9 Drawing Sheets

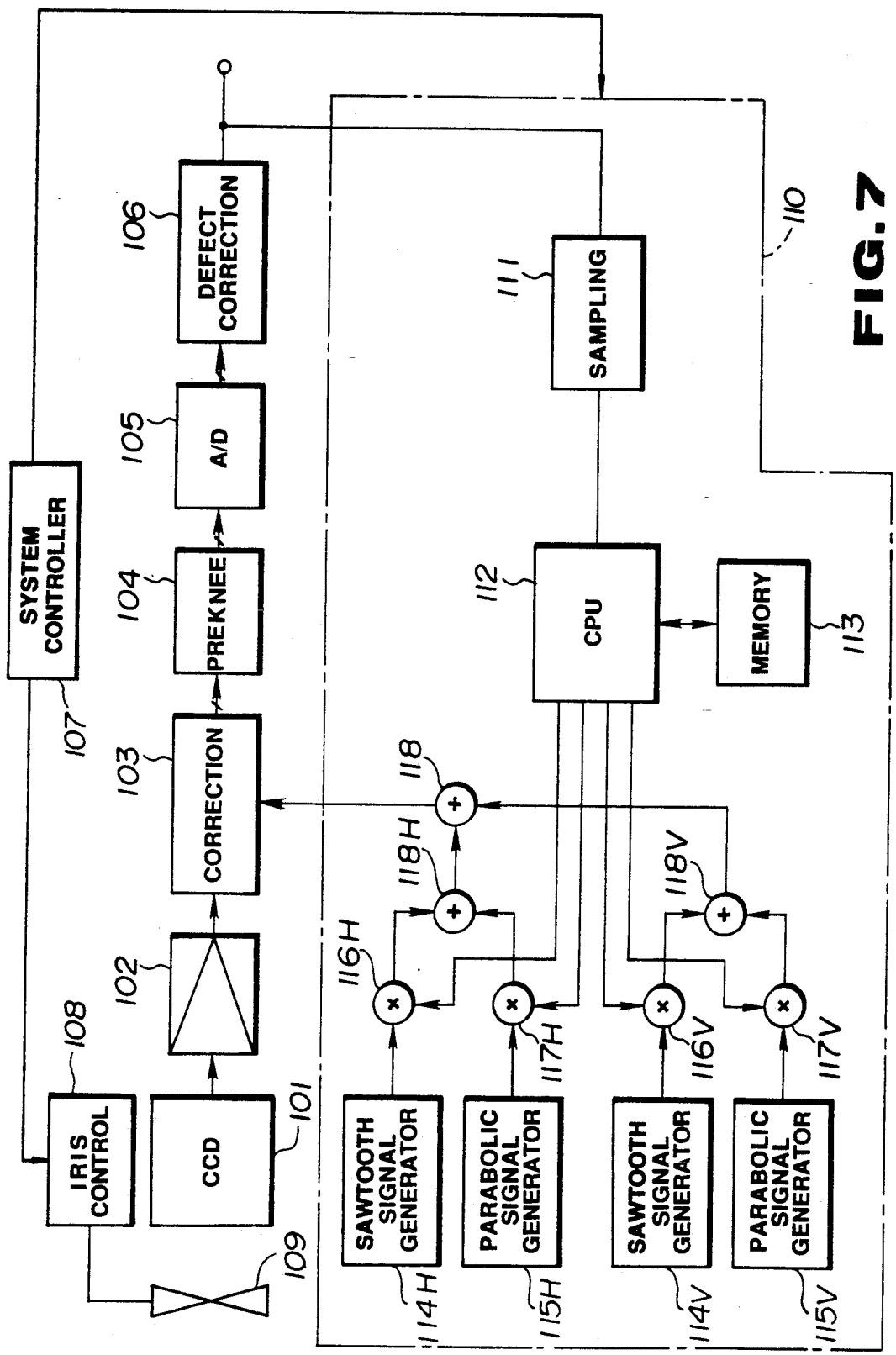

SAWTOOTH SIGNAL OUTPUT $(y = \frac{1}{b} x - \frac{n}{2b})$

PARABOLIC SIGNAL OUTPUT
$(y = \frac{1}{2a}x^2 - \frac{n^2}{3a})$

DARK CURRENT AND DEFECTIVE PIXEL CORRECTION APPARATUS

BACKGROUND OF THE INVENTION

1. Field of the Invention

This invention relates to dark current correction apparatus for eliminating a dark current signal component from an output signal of an image pick-up device having a plurality of pixels, which may for example be arranged in an array having, for instance, a matrix configuration.

2. Description of the Prior Art

Output signals (also referred to hereinafter as "imaging output signals") obtained from image pick-up devices (also referred to hereinafter as "imaging devices") such as video cameras are known to suffer from dark current arising from a number of causes, such as fluctuations in sensitivity of the imaging device or dark current effects, that is distortions in brightness over a wide extent of a viewing screen. For example, in a solid state imaging device, such as a charge coupled imaging device (CCD imaging device), it has been proposed to use a variety of image sensors, such as frame charge transfer, interline charge transfer or frame interline charge transfer type image sensors, according to which signal charges from pixels of the sensor, which are arranged in a matrix configuration, are transferred in the vertical direction and are sequentially read out by means of a horizontal transfer register, so that one horizontal line is read out during one horizontal scanning period, and the signal charges for the totality of the pixels of the device (and therefore for the totality of the pixels of a field or frame) are read out during one vertical scanning period, so as to produce an imaging output signal. Thus, a dark current proportional to the time during which the signal charges are transferred to the horizontal transfer register is added to the signal charges to give rise to sawtooth (serrated) changes in brightness during each vertical scanning period, that is dark current in the vertical direction. On the other hand, the dark current in the horizontal transfer register gives rise to sawtooth (serrated) changes in brightness during each horizontal scanning period, that is dark current in the horizontal direction.

In general, the above-mentioned dark current may be classified into white (modulation) according to which the output is lowered in peripheral regions of the viewing screen, and black (superposition) according to which the black level is not uniform throughout the viewing screen. Dark current correction processing is conventionally performed by mixing dark current correction signals into the imaging output signals in an analog fashion, using a multiplier for white and an adder for black. The dark current correction signals may be formed by generating sawtooth and parabolic signals for the horizontal and vertical directions, and combining these signals.

With the conventional dark current correction circuit, output levels of the sawtooth signal generators and the parabolic signal generators may be manually adjusted by means of a level control means, such as a volume knob. Thus, the output levels of the signal generators are adjusted manually to achieve optimum dark current correcting processing while reference is continuously made to a waveform monitor. U.S. Pat. No. 4,731,652, issued Mar. 15, 1988 to Yamanaka, discloses such an arrangement in which the levels of output signals of horizontal and vertical sawtooth and parabolic waveform generators are manually adjustable by means of gain control circuits comprising variable resistors.

If use is made of a three color CCD imaging system in which an object image is separated into color components, for example red, green and blue components, and images of the three color components are formed separately by three respective imaging devices, dark current correction has to be performed for each of the imaging devices.

Since, with the conventional dark current correction circuit, dark current correction is achieved by manually adjusting the output levels of the sawtooth and parabolic signal generators while continuously referring to a waveform monitor, the problem arises that a time-consuming adjustment operation by a skilled operator is needed for achieving accurate adjustment. This problem is serious even in the case of a single output imaging device. The problem is even more serious in the case of the three color CCD imaging system, in that the dark current correction that has to be performed for each of the three imaging devices is even more labor-intensive and time-consuming.

SUMMARY AND OBJECTS OF THE INVENTION

First Form of Implementation

A first object of the invention is to provide a dark current correction apparatus for eliminating (wholly or partially) a dark current signal component from an imaging output signal of one or more imaging devices having a plurality of pixels (arranged for instance in a matrix configuration), which enables satisfactory dark current correction to be achieved quickly and reliably.

According to one aspect of a first form of implementation thereof, directed to achieving the first object mentioned above, the invention provides a dark current, correction apparatus in which dark current, correction data for use in dark current correction are formed from an imaging output signal obtained from an imaging device and are stored in memory means, the dark current correction data are read out from the memory means during actual imaging, and dark current correction of the imaging output signal of the imaging device is automatically performed by correction means with the aid of a dark current correction signal formed by correction signal forming means on the basis of the stored dark current correction data.

According to another aspect of the first form of implementation thereof, the invention provides a dark current correction apparatus for eliminating (partially or wholly) dark current signal components from imaging output signals of plural imaging devices each having an array of a large number of pixels in a matrix configuration, wherein level data of imaging output signal portions corresponding to a predetermined number of the pixels are stored in storage means as dark current correction data, those imaging output signals of the imaging devices having been produced under light exposure control by light exposure control means and digitized by analog/digital converters, dark current correction signals are formed by dark current correction signal forming means on the basis of the dark current correction data read out from the storage means, and imaging output signals of the imaging devices are automatically processed by dark current correction means during actual imaging on the basis of dark current correction signals supplied by correction signal forming means.

According to a further aspect of the first form of implementation thereof, the invention provides a dark current apparatus for eliminating dark current signal components of imaging output signals of imaging devices each having a large number of pixels arranged in a matrix configuration, the apparatus comprising light exposure control means for the imaging devices, analog to digital converters for digitizing imaging output signals of the imaging devices, storage means for storing level data of the imaging output signals of a predetermined number of the pixels as dark current correction data, those imaging output signals of the imaging devices having been produced under light exposure control by the light exposure control means and digitized by the analog to digital converters, dark current correction signal forming (generating) means for forming dark current correction signals on the basis of the dark current correction data read out from the storage means, and correction means for subjecting imaging output signals of the imaging devices to dark current correction processing on the basis of the dark current correction signals formed by the correction signal forming means during imaging. The output signals of the analog to digital converters are thus available to downstream signal processing circuits as dark current corrected imaging output signals.

The stored dark current correction data may be derived from imaging output signals produced by the imaging devices under a condition in which no light is incident on imaging surfaces of the imaging devices, whereby dark current correction signals are formed by the correction signal forming means on the basis of the dark current correction data read out from the storage means. The correction means may then subject the imaging output signals to dark current correction by subtracting the dark current correction signals from imaging output signals of the imaging devices.

Additionally or alternatively, the stored dark current correction data may be derived from imaging output signals produced by the imaging devices with light of uniform light intensity or volume incident on the entirety of the imaging surfaces of the imaging devices, whereby dark current correction signals are formed by the correction signal forming means on the basis of the dark current correction data read out from the storage means. The correction means may then subject the imaging output signals to white shading correction by dividing the imaging output signals of the imaging devices by the dark current correction signals.

The storage means may comprise a random access memory and an electrically erasable programmable read-only memory, and the output signals of the analog to digital converters may be stored in the programmable read-only memory at a reduced data volume so that the number of the output data is less at the middle than at the margin (periphery) of each of the imaging surfaces. The random access memory may be used for forming the dark current correction data or correcting the dark current on the basis of the dark current correction data, whereas the electrically erasable programmable read-only memory thereof may be used for prolonged storage of the dark current correction data.

Second Form of Implementation

A second object of the invention is to provide a dark current correction apparatus for performing dark current correction of an imaging output signal from an imaging device by means of a sawtooth signal generated by a sawtooth signal generating means and a parabolic signal generated by a parabolic signal generating means, in which optimum dark current correction processing may be realized quickly and reliably.

A third object of the invention is to provide a dark current correction apparatus in which sawtooth and parabolic signals having signal levels necessary for effecting dark current correction are formed automatically on the basis of an imaging output signal obtained from the imaging device, in order that a satisfactory dark current correcting operation may be performed automatically.

According to one aspect of a second form of implementation thereof, directed to achieving the second and third objects mentioned above, the invention provides a dark current correction apparatus in which an imaging output signal from an imaging device is subjected to dark current correction processing by means of sawtooth (serrated) signals from sawtooth (serrated) signal generating means and parabolic signals from parabolic signal generating means, level data of an imaging output signal of pixels of the imaging device produced with no light incident on the imaging device, or with light of uniform light intensity incident on the whole of an imaging surface of the imaging device, are sampled at predetermined intervals in the vertical and horizontal directions to produce first and second data strings, coefficients of the sawtooth signals and parabolic signals used for dark current correction processing are calculated on the basis of the first and second data strings and, using these coefficients, the signal levels of the sawtooth signals and parabolic signals are controlled during imaging in order automatically to perform satisfactory dark current correcting processing.

According to another aspect of the second form of implementation thereof, the invention provides a dark current correction apparatus for eliminating (partially or wholly) a dark current signal component from an imaging output signal produced by an imaging device having an array of a large number of pixels arranged in a matrix configuration, the apparatus comprising an analog to digital converter for digitizing an imaging output signal from the imaging device, sampling means for sampling level data of an imaging output signal for pixels of said imaging device at predetermined intervals in the vertical and horizontal directions in order to produce first and second data strings, that imaging output signal having been produced and digitized by the analog to digital converter with no light incident on the imaging device, or with light of a uniform light intensity incident on all of an imaging surface of the imaging device, arithmetic means for finding first and second quadratic curves on the basis of the first and second data strings outputted from the sampling means, sawtooth signal generating means for generating a sawtooth signal, parabolic signal generating means for generating a parabolic signal, a first level control circuit for controlling the signal level of the parabolic signal on the basis of coefficients of the second order terms of the first and second quadratic curves found by the arithmetic means, a second level control circuit for controlling the signal level of the sawtooth signal on the basis of coefficients of the first order terms of the first and second quadratic curves found by the arithmetic means, and correction means for subjecting an imaging output signal from the imaging device to dark current correction processing by the parabolic and sawtooth signals as controlled in signal level by the first and second level control circuits. Output data of the analog to digital converter are thus available to downstream signal processing circuitry as dark current corrected imaging output data.

BRIEF DESCRIPTION OF THE DRAWINGS

The above and other objects, features and advantages of this invention will be apparent from the following detailed description of illustrative embodiments thereof, which is to be read in conjunction with the accompanying drawings, in which:

FIG. 7 is a block diagram showing the construction of a dark current correction apparatus according to a second embodiment of the invention;

DESCRIPTION OF THE PREFERRED EMBODIMENTS

A dark current correction apparatus according to a first embodiment of the invention will now be described in detail with reference to FIGS. 1 to 6 of the drawings. In this specification, "dark current" and "defective pixel" corrections are used interchangeably.

Figure 1:
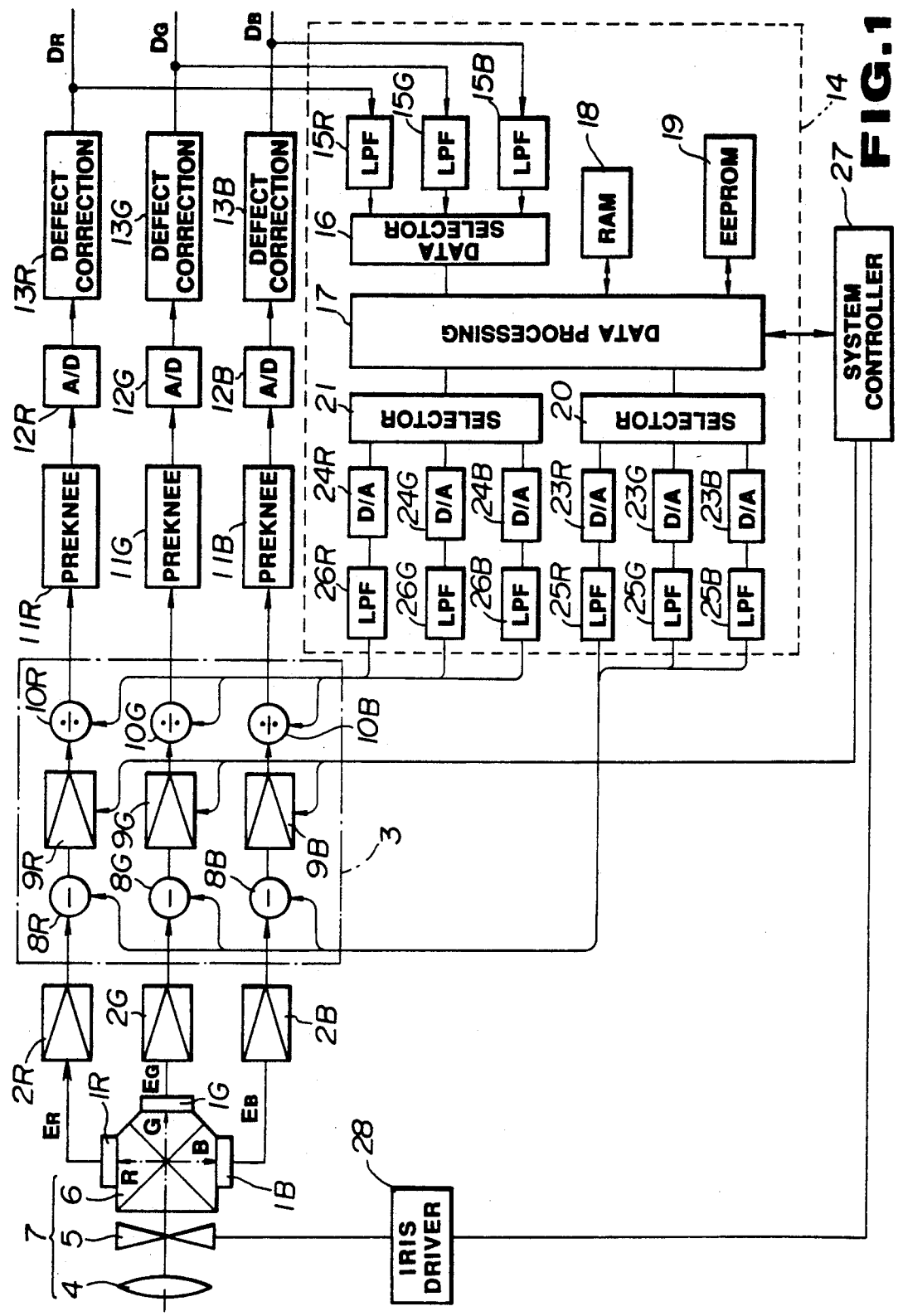
FIG. 1 is a block diagram showing the construction of a dark current correction apparatus according to a first embodiment of the invention.
Figure 2:
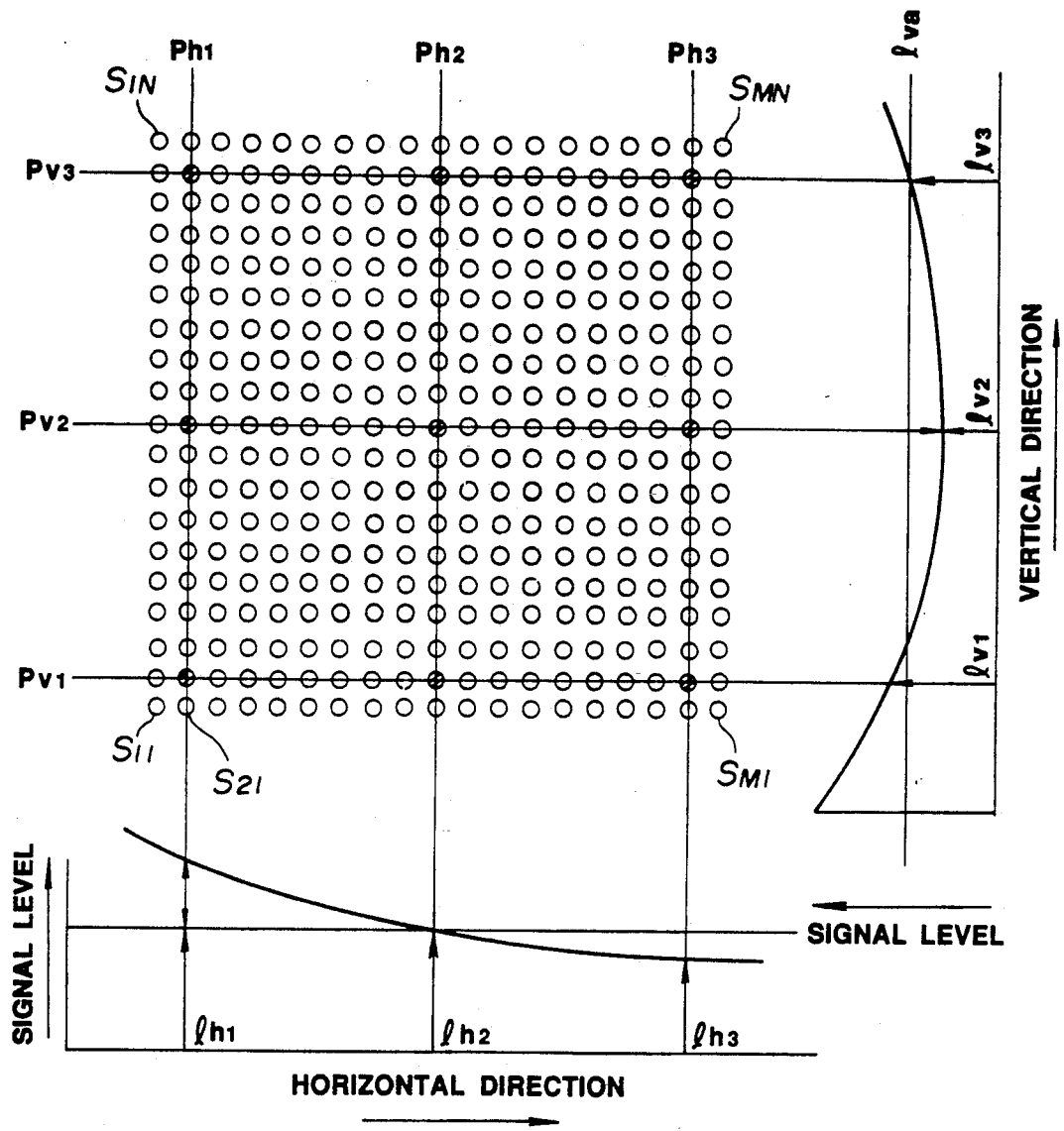
FIG. 2 is an illustrative view showing the arrangement of an array of pixels of a solid-state imaging device supplying an imaging output signal to the dark current correction apparatus of FIG. 1, and typical shading characteristics thereof in the horizontal and vertical directions.

In the present embodiment, the invention is applied by way of example to a three color CCD imaging device. As shown in FIG. 1, imaging output signals $E_R$, $E_G$ and $E_B$ produced by first, second and third imaging devices 1R, 1G and 1B for R, G and B (red, green and blue) channels, respectively, are supplied to a correction circuit 3 by means of preamplifiers 2R, 2G and 2B, respectively. The imaging devices 1R, 1G and 1B constitute an imaging section of the above-mentioned three color CCD imaging device, which is provided in an imaging optical system 7 including an imaging lens 4, an iris unit or device 5 and a color separation prism 6. Each of the imaging devices 1R, 1G and 1B is a CCD image sensor formed by a number $(M \times N)$ of pixels $S_{11}$ to $S_{MN}$ (FIG. 2) arranged in a matrix array comprising a number M of pixels in the horizontal direction and a number N of pixels in the vertical direction, as shown in FIG. 2, and is driven by a CCD driver (not shown) so that signal charges from the totality of the pixels $S_{11}$ to $S_{MN}$ for each field or frame will be read out during one vertical scanning period.

The red color component of the imaging output signal $E_R$ of an object image, which has been color-separated by the color separating prism 6, is supplied from the first imaging device 1R to the correction circuit 3 by way of the preamplifier 2R as an R-channel signal. The green color component of the image output signal $E_G$ of the object image, which has been color-separated by the color separating prism 6, is supplied from the second imaging device 1G to the correction circuit 3 by way of the preamplifier 2G as a G-channel signal. Similarly, the blue color component of the image output signal $E_B$ of the object image, which has been color-separated by the color separating prism 6, is supplied from the third imaging device 1B to the correction circuit 3 by way of the preamplifier 2B as a B-channel signal.

The correction circuit 3 processes the imaging output signals $E_R$, $E_G$ and $E_B$, produced by the imaging devices 1R, 1G and 1B for the R, G and B channels, respectively, by effecting black dark current correction processing and white dark current correction processing. The correction circuit 3 includes subtractors 8R, 8G and 8B for the R, G and B channels, supplied with the imaging output signals $E_R$, $E_G$ and $E_B$, respectively, and dividers 10R, 10G and 10B for the R, G and B channels, supplied with subtraction output signals from the subtractors 8R, 8G and 8B, by means of variable gain preamplifiers 9R, 9G and 9B, respectively.

In the correction circuit 3, the subtractors 8R, 8G and 8B process the imaging output signals $E_R$, $E_G$ and $E_B$ of the R, G and B channels, respectively, by effecting black dark current correction processing by subtracting from the imaging output signals $E_R$, $E_G$ and $E_B$ black dark current correction signals $B_{RSH}$, $B_{GSH}$ and $B_{BSH}$ for the R, G and B channels, respectively, that are supplied from a dark current correction signal forming section 14 by which they are generated as described hereinbelow. The variable gain amplifiers 9R, 9G and 9B process the imaging output signals $E_R$, $E_G$ and $E_B$ of the R, G and B channels by signal level adjustment, such as white balance or black balance adjustment, and are gain-controlled by control signals for the R, G and B channels supplied from a system controller 27 described hereinbelow. The dividers 10R, 10G and 10B process the imaging output signals $E_R$, $E_G$ and $E_B$ of the R, G and B channels, respectively, by effecting white dark current correction processing by dividing the imaging output signals $E_R$, $E_G$ and $E_B$ by white dark current correction signals $W_{RSH}$, $W_{GSH}$ and $W_{BSH}$ for the R, G and B channels, respectively, that are supplied from the dark current correction signal forming section 14.

The dividers 10R, 10G and 10B may be implemented as multipliers operative to multiply the imaging output signals $E_R$, $E_G$ and $E_B$ of the R, G and B channels by reciprocals of the white dark current correction signals $W_{RSH}$, $W_{GSH}$ and $W_{BSH}$, respectively.

The imaging output signals $E_R$, $E_G$ and $E_B$, corrected by the correction circuit 3, are supplied therefrom to analog to digital (A/D) converters 12R, 12G and 12B of the R, G and B channels, respectively, via respective preknee circuits 11R, 11G and 11B.

The preknee circuits 11R, 11G and 11B effect non-linear processing of the imaging output signals $E_R$, $E_G$ and $E_B$ of the R, G and B channels outputted by the correction circuit 3 in order to prevent the input signal levels to the A/D converters 12R, 12G and 12B exceeding the dynamic range thereof.

The A/D converters 12R, 12G and 12B provide digital level data indicating the signal levels of the imaging output signals $E_R$, $E_G$ and $E_B$ as corrected by the correction circuit 3. Level data indicating the levels of the imaging output signals $E_R$, $E_G$ and $E_B$ of the R, G and B channels, provided by the A/D converters 12R, 12G and 12B, respectively, are supplied as dark current corrected concurrent imaging output data $D_R$, $D_G$ and $D_B$ to the dark current correction signal forming section (also referred to hereinafter as "the dark current correction signal former") 14, and to downstream signal processing circuits (not shown), via defect correction circuits 13R, 13G and 13B, respectively.

The defect correction circuits 13R, 13G and 13B process signal charges from defective pixels of the imaging devices 1R, 1G and 1B, that is parts of the imaging output signals $E_R$, $E_G$ and $E_B$ corresponding to defective pixels of the R, G and B channels, by defect correction processing that corrects their signal levels on the basis of level data of previously detected defective pixels.

The dark current correction signal former 14 includes: low-pass filters (LPFs) 15R, 15G and 15B supplied with the concurrent imaging output data $D_R$, $D_G$ and $D_B$ of the channels R, G and B, respectively; a data selector 16 supplied with the concurrent imaging output data $D_R$, $D_G$ and $D_B$, respectively, by means of the low-pass filters 15R, 15G and 15B; a data processing circuit 17 supplied with dot sequential data D[R/G/B] selected by the data selector 16; a working memory 18, which is an overwritable random access memory (RAM), connected to the data processing circuit 17; a backup memory 19, which is an electrically erasable and programmable read-only memory (EEPROM), similarly connected to the data processing circuit 17; a data selector 20 for distributing black correction data $D[B_{RSH}/B_{GSH}/B_{BSH}]$, outputted dot-sequentially from the data processing circuit 17, to the R, G and B channels; a data selector 21 for distributing white shading correction data $D[W_{RSH}/W_{GSH}/W_{BSH}]$, outputted dot-sequentially from the data processing circuit 17, to the R, G and B channels; digital to analog (D/A) converters 23R, 23G and 23B for converting the black dark current correction data $D[B_{RSH}]$, $D[B_{GSH}]$ and $D[B_{BSH}]$, distributed by the data selector 20, into corresponding analog signals; D/A converters 24R, 24G and 24B for converting the white dark current correction data $D[W_{RSH}]$, $D[W_{GSH}]$ and $D[W_{BSH}]$ for the R, G and B channels, as distributed by the data selector 21, into corresponding analog signals; and low-pass filters 25R, 25G, 25B, 26R, 26G and 26B provided on the output sides of the D/A converters 23R, 23G, 23B, 24R, 24G and 24B, respectively.

The low-pass filters 15R, 15G and 15B of the dark current correction signal former 14 are digital filters having a cut-off frequency equal to one-eighth of a clock frequency of the A/D converters 12R, 12G and 12B, and limit the bandwidths of the concurrent imaging output data $D_R$, $D_G$ and a $D_B$ to one-eighth by performing bandwidth limitation.

The data selector 16 selects the concurrent imaging output data $D_R$, $D_G$ and $D_B$ of the channels R, G and B, as thus bandwidth-limited by the low-pass filters 15R, 15G and 15B, dot-sequentially on a channel-by-channel basis, thereby forming the dot-sequential data D[R/G/B] with the number of data reduced to one-eighth of the original number. The dot-sequential data D[R/G/B], thus formed by data selector 16, indicate dot-sequentially the signal levels of the imaging output signals from signal charges of every eighth pixel of the pixels $S_{11}$ to $S_{MN}$ of the imaging devices 1R, 1G and 1B, namely those shown hatched in FIG. 2.

It is to be noted that a driver or control circuit 28 of the iris unit 5 of the imaging optical system 7 is so controlled by the system controller 27 that: for detecting the black dark current characteristics, the iris unit 5 is closed and the imaging devices 1R, 1G and 1B perform an imaging operation without any light falling on their respective imaging surfaces; and, for detecting the white dark current characteristics, the iris unit 5 is opened and the imaging devices 1R, 1G and 1B perform an imaging operation with light of a uniform light intensity corresponding to 100 percent brightness falling on the entirety of the imaging surfaces.

Figure 3:
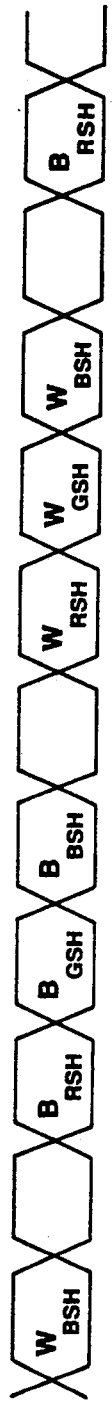
FIG. 3 is an illustrative view showing data strings of black dark current correction data and white dark current correction data stored in a memory of the shading correction apparatus of FIG. 1.

The data processing circuit 17 finds black dark current correction data $D[B_{RSH}/B_{GSH}/B_{BSH}]$ and white dark current correction data $D[W_{RSH}/W_{GSH}/W_{BSH}]$, consistent with the black and white dark current characteristics of the imaging devices 1R, 1G and 1B, on the basis of the dot-sequential data D[R/G/B] supplied from the data selector 16, and stores the data dot-sequentially in the working memory 18 as shown in FIG. 3. During actual imaging, the data processing circuit 17 reads out the black dark current correction data $D[B_{RSH}/B_{GSH}/B_{BSH}]$ and the white dark current correction data $D[W_{RSH}/W_{GSH}/W_{BSH}]$ from the working memory 18 dot-sequentially so that the thus read-out data can be outputted by means of the data selectors 20 and 21.

In the present embodiment, the data processing circuit 17 processes the dot-sequential data D[R/G/B], indicating dot-sequentially the signal levels of the imaging output signals from signal charges at every eighth pixel of the pixels $S_{11}$ to $S_{MN}$ of the imaging devices 1R, 1G and 1B, by: integrating the level data indicative of the imaging output levels of the pixels lying at the same horizontal positions $P_{h1}$ to $P_{hm}$ as shown in FIG. 2 to produce a data strong $D[1_{h1}$ to $1_{hm}]$ indicating the horizontal dark current characteristics with the use of level data having a thereby improved signal to noise (S/N) ratio to produce horizontal dark current correction data dot-sequentially from the data string $D[1_{h1}$ to $1_{hm}]$; and by integrating the level data indicative of the imaging output levels of the pixels lying at the same vertical positions $P_{v1}$ to $P_{vm}$ to produce a data string $D[1_{v1}$ to $1_{vm}]$ indicating the vertical dark current characteristics with the use of level data having a thereby improved S/N ratio to produce vertical dark current correction data dot-sequentially from the data string D[$1_{v1}$ to $1_{vm}$].

Figure 4:
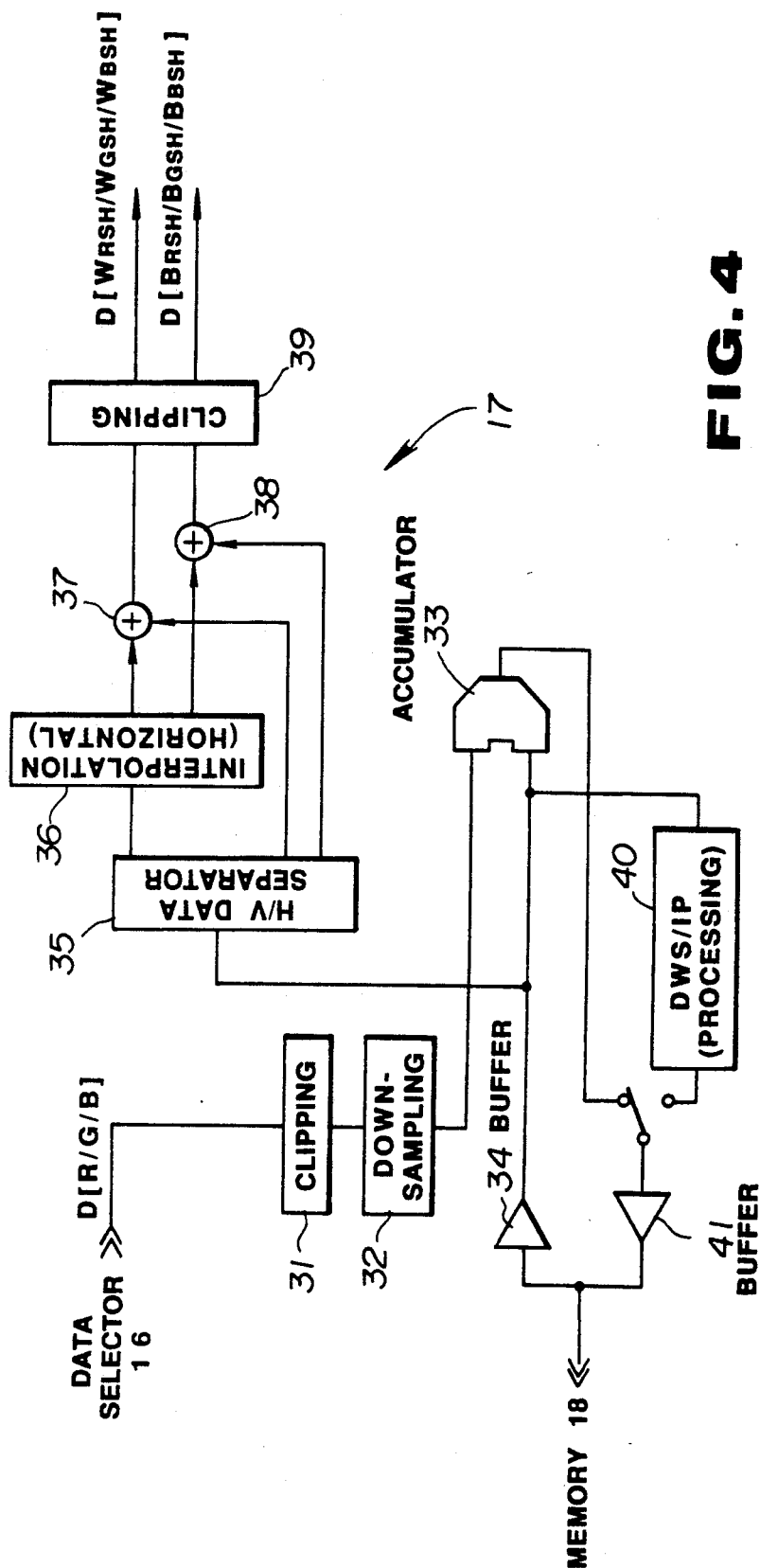
FIG. 4 is a block diagram showing the detailed construction of a data processing circuit of a dark current correction signal forming section of the dark current correction apparatus of FIG. 1.

The data processing circuit 17 may for example be constructed as shown in FIG. 4. Thus, the dot-sequential data D[R/G/B] from the data selector 16 are supplied to a clipping circuit 31. The clipping circuit 31 processes the dot-sequential data D[R/G/B] by dot-sequential subtraction of the mean values of the respective frames of the imaging devices 1R, 1G and 1B and clipping to the lower n bits. The clipped dot-sequential data D[R/G/B] are supplied to a down-sampling circuit 32 which processes the clipped dot-sequential data D[R/G/B] by limiting the bandwidth of the dot-sequential data D[R/G/B] indicating the dark current characteristics of the imaging devices 1R, 1G and 1B to one sixteenth by using, for example, a digital filter having a transfer function H(z) given by:

$$H(z) = \tfrac{1}{4}Z^{-4} + \tfrac{1}{2}Z^{0} + \tfrac{1}{4}Z^{4}.$$

The dot-sequential data D[R/G/B], thus down-sampled by the down-sampling circuit 32, are supplied to an accumulator or register 33. The accumulator 33 processes the dot-sequential data D[R/G/B] by concurrently adding and integrating the level data indicating the imaging output levels of the pixels at the same horizontal positions $P_{h1}$ to $P_{hn}$, using the working memory 18, as shown in FIG. 2, thereby producing black dark current correction data D[$B_{RSH}/B_{GSH}/B_{BSH}$]$_H$ and white dark current correction data D[$W_{RSH}/W_{GSH}/W_{BSH}$]$_H$ dot-sequentially as dark current correction data consistent with the horizontal component for each of the imaging devices 1R, 1G and 1B. The accumulator 33 also processes the dot-sequential data D[R/G/B] by integrating the level data indicating the imaging output levels of the pixels at the same horizontal positions $P_{v1}$ to $P_{vm}$, using the working memory 18, thereby producing black correction data D[$B_{RSH}/B_{GSH}/B_{BSH}$]$_V$ and white dark current correction data D[$W_{RSH}/W_{GSH}/W_{BSH}$]$_V$ dot-sequentially as dark current correction data consistent with the vertical shading component for each of the imaging devices 1R, 1G and 1B. It will be noted that the black dark current correction data D[$B_{RSH}/B_{GSH}/B_{BSH}$]$_H$ and the white dark current correction data D[$W_{RSH}/W_{GSH}/W_{BSH}$]$_H$ in the horizontal direction are formed by concurrent addition in the accumulator 33, while the black dark current correction data D[$B_{RSH}/B_{GSH}/B_{BSH}$]$_V$ and the white dark current correction data D[$W_{RSH}/W_{GSH}/W_{BSH}$]$_V$ in the vertical direction are formed by concurrent addition in memory, using the working memory 18.

In this manner, the black dark current correction data D[$B_{RSH}/B_{GSH}/B_{BSH}$]$_H$ and the white dark current correction data D[$W_{RSH}/W_{GSH}/W_{BSH}$]$_H$ in the horizontal direction, as well as the black dark current correction data D[$B_{RSH}/B_{GSH}/B_{BSH}$]$_V$ and the white dark current correction data D[$W_{RSH}/W_{GSH}/W_{BSH}$]$_V$ in the vertical direction, for the imaging devices 1R, 1G and 1B, formed from the dot-sequential data D[R/G/B], are written and stored dot-sequentially in the working memory 18.

The black dark current correction data D[$B_{RSH}/B_{GSH}/B_{BSH}$]$_H$ and the white dark current correction data D[$W_{RSH}/W_{GSH}/W_{BSH}$]$_H$ in the horizontal direction, as well as the black dark current correction data D[$B_{RSH}/B_{GSH}/B_{BSH}$]$_V$ and the white dark current correction data D[$W_{RSH}/W_{GSH}/W_{BSH}$]$_V$ in the vertical direction, thus stored in the working memory 18, are read out dot-sequentially from the working memory 18 and supplied via a buffer 34 to a horizontal/vertical (H/V) data separator 35 when performing dark current correction of the imaging output signals of the R, G and B channels.

The data separator 35 separates the black dark current correction data D[$B_{RSH}/B_{GSH}/B_{BSH}$]$_H$ and the white correction data D[$W_{RSH}/W_{GSH}/W_{BSH}$]$_H$ for the horizontal direction and the black dark current correction data D[$B_{RSH}/B_{GSH}/B_{BSH}$]$_V$ and the white dark current correction data D[$W_{RSH}/W_{GSH}/W_{BSH}$]$_V$ for the vertical direction, and transmits the black dark current correction data D[$B_{RSH}/B_{GSH}/B_{BSH}$]$_H$ and the white dark current correction data D[$W_{RSH}/W_{GSH}/W_{BSH}$]$_H$ for the horizontal direction to an interpolation circuit 36, while transmitting the black current correction data D[$B_{RSH}/B_{GSH}/B_{BSH}$]$_V$ and the white dark current correction data D[$W_{RSH}/W_{GSH}/W_{BSH}$]$_V$ to adders 37 and 38, respectively.

The interpolation circuit 36 processes the black dark current correction data D[$B_{RSH}/B_{GSH}/B_{BSH}$]$_H$ and the white dark current correction data D[$W_{RSH}/W_{GSH}/W_{BSH}$]$_H$, supplied thereto from the data separator 35 dot-sequentially at a data rate equal to one eighth of the clock frequency, by mean value interpolation, while separating the black dark current correction data D[$B_{RSH}/B_{GSH}/B_{BSH}$]$_H$ and the white shading correction data D[$W_{RSH}/W_{GSH}/W_{BSH}$]$_H$ from each other and outputting these separated data at a data rate of $\tfrac{1}{4}$.

The horizontal black dark current correction data D[$B_{RSH}/B_{GSH}/B_{BSH}$]$_H$, obtained at the data rate of $\tfrac{1}{4}$ from the interpolation circuit 35, are supplied to the adder 37. The adder 37 adds the horizontal black dark current correction data D[$B_{RSH}/B_{GSH}/B_{BSH}$]$_H$ to the vertical black dark current correction data D[$B_{RSH}/B_{GSH}/B_{BSH}$]$_V$ to form horizontal and vertical black dark current correction data D[$B_{RSH}/B_{GSH}/B_{BSH}$] which are then outputted by means of a clipping circuit 39.

The horizontal white dark current correction data D[$W_{RSH}/W_{GSH}/W_{BSH}$]$_H$, outputted at the data rate of $\tfrac{1}{4}$ by the interpolating circuit 36, are supplied to the adder 38. The adder 38 adds the horizontal white dark current correction data D[$W_{RSH}/W_{GSH}/W_{BSH}$]$_H$ and the vertical white shading correction data D[$W_{RSH}/W_{GSH}/W_{BSH}$]$_V$ to each other to produce horizontal and vertical white dark current correction data D[$W_{RSH}/W_{GSH}/W_{BSH}$], which are then outputted by means of the clipping circuit 39.

Referring back to FIG. 1, the data selector 20, supplied with the black dark current correction data D[$B_{RSH}/B_{GSH}/B_{BSH}$] dot-sequentially outputted from the data processing circuit 17, is operative to distribute the black dark current correction data D[$B_{RSH}/B_{GSH}/B_{BSH}$] to the D/A converters 23R, 23G and 23B of the R, G and B channels, and is constituted by, for example, a latch circuit. The black dark current correction data D[$B_{RSH}$], D[$B_{GSH}$] and D[$B_{BSH}$] supplied from the selector 20 are converted into analog signals by the D/A converters 23R, 23G and 23B, respectively.

The output signal from the D/A converter 23R for converting the black dark current correction data D[$B_{RSH}$] into an analog signal are supplied via the low-pass filter 25R to the R-channel subtractor 8R of the correction circuit 3 as the black dark current correction signal $B_{RSH}$. The output signal from the D/A converter 23G for converting the black dark current correction data $D[B_{GSH}]$ into an analog signal are supplied via the low-pass filter 25G to the G-channel subtractor 8G of the correction circuit 3 as the black dark current correction signal $B_{GSH}$. Similarly, the output signal from the D/A converter 23B for converting the black dark current correction data $D[B_{BSH}]$ into an analog signal are supplied via the low-pass filter 26B to the B-channel subtractor 8B of the correction circuit 3 as the black dark current correction signal $B_{BSH}$.

The data selector 21, supplied with the white dark current correction data $D[W_{RSH}/W_{GSH}/W_{BSH}]$ dot-sequentially outputted from the data processing circuit 17, is operative to distribute the white dark current correction data $D[W_{RSH}/W_{GSH}/W_{BSH}]$ to the D/A converters 24R, 24G and 24B of the R, G and B channels, and is constituted by, for example, a latch circuit. The D/A converters 24R, 24G and 24B are operative to convert the white dark current correction data $D[B_{RSH}]$, $D[B_{GSH}]$ and $D[B_{BSH}]$ from the data selector 21 into analog signals.

The output signal of the D/A converter 24R for converting the white dark current correction data $D[W_{RSH}]$ into an analog signal are supplied via the low-pass filter 26R to the R-channel divider 8R of the correction circuit 3 as the white dark current correction signal $W_{RSH}$. The output signal of the D/A converter 24G for converting the white dark current correction data $[W_{GSH}]$ into an analog signal are supplied via the low-pass filter 26G to the G-channel divider 8G of the correction circuit 3 as the white dark current correction signal $W_{GSH}$. Similarly, the output signal of the D/A converter 24B for converting the white dark current correction data $D[W_{BSH}]$ into an analog signal are supplied via the low-pass filter 26B to the B-channel divider 8B of the correction circuit 3 as the white dark current correction signal $W_{BSH}$.

Figure 5:
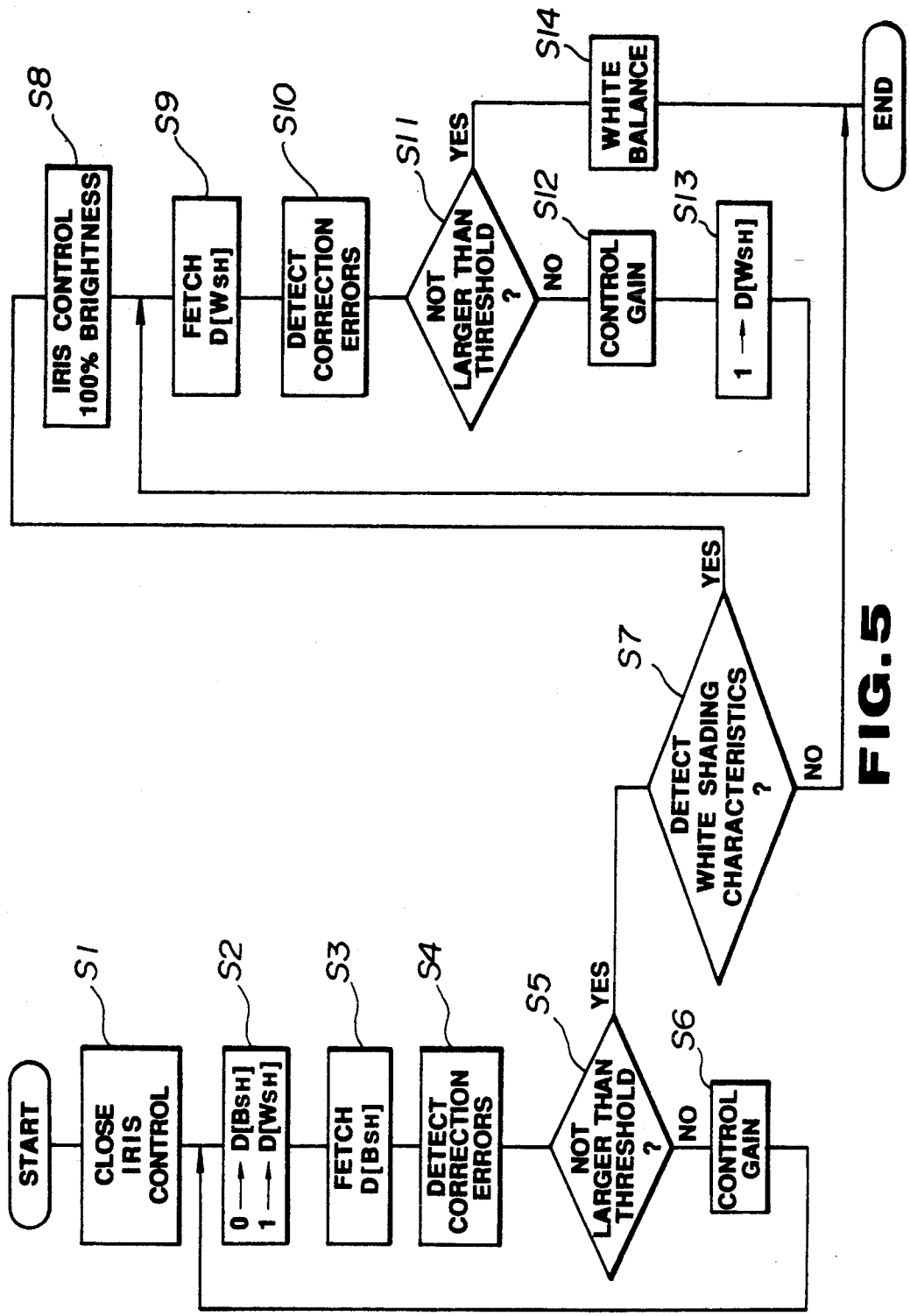
FIG. 5 is a flow chart showing a control procedure carried out by a system controller of the dark current correction apparatus of FIG. 1.

The shading correction apparatus of the present embodiment is controlled by the system controller 27 in a manner which will now be described with reference to a flow chart shown in FIG. 5.

Thus, when a dark current detection mode is entered, the operation of detecting the black dark current characteristics is initiated. At a first step $S_1$, the iris unit 6 is closed and the imaging devices 1R, 1G and 1B thus perform an imaging operation without any light falling on their imaging surfaces.

At the next (second) step $S_2$, the black dark current correction data $D[B_{RSH}/B_{GSH}/B_{BSH}]$ in the working memory 18 are all set to 0, while the white dark current correction data $D[W_{RSH}/W_{GSH}/W_{BSH}]$ are all set to 1.

At the next (third) step $S_3$, the data processing circuit 17 processes the imaging output signals $E_R$, $E_G$ and $E_B$, produced by the imaging devices 1R, 1G and 1B without any light incident on their imaging surfaces, for forming black dark current correction data $D[B_{RSH}/B_{GSH}/B_{BSH}]$ on the basis of the dot-sequential data $D[R/G/B]$ and dot-sequentially storing the data in the working memory 18.

At the next (fourth) step $S_4$, the data processing circuit 17 reads out the black dark current correction data $D[B_{RSH}/B_{GSH}/B_{BSH}]$ and the white dark current correction data $D[W_{RSH}/W_{GSH}/W_{BSH}]$ dot-sequentially from the working memory 18 and processes the imaging output signals $E_R$, $E_G$ and $E_B$ from the imaging devices 1R, 1G and 1B by effecting dark current correction processing by means of the correction circuit 3. The data processing circuit 17 then detects black shading correction errors of the dark current corrected imaging output signals $E_R$, $E_G$ and $E_B$ by, for example, a least squares method.

At the next (fifth) step $S_5$, it is determined whether the black dark current correction errors of the dark current corrected imaging output signals $E_R$, $E_G$ and $E_B$ detected at the fourth step $S_4$ are not larger than a predetermined value (threshold). If the result of the decision made at the fifth step $S_5$ is NO, that is if the dark current correction errors are larger than the predetermined value, the system controller 27 proceeds to a step $S_6$ to control the gains of the variable gain amplifiers 9R, 9G and 9B of the correction circuit 3 in a direction to reduce the dark current correction errors. The system controller then reverts to the step $S_2$ to repeat the operations from the step $S_2$ to the step $S_6$. If the result of the decision made at the fifth step $S_5$ is YES, that is if the dark current correction errors are not larger than the predetermined value, the operation of detecting the black dark current characteristics is terminated when the dark current corrected imaging output signals $E_R$, $E_G$ and $E_B$ fall to below the predetermined value. The system controller 27 then proceeds to a seventh step $S_7$.

At the seventh step $S_7$, the system controller 27 decides whether detection of the white dark current characteristics is to be performed. If the result of the decision is NO, that is if detection of the white dark current characteristics is not to be performed, the control operation of the detection mode of detecting the white dark current characteristics is terminated. If the result of the decision at the seventh step $S_7$ is YES, that is if detection of the white dark current characteristics is to be performed, the system controller 27 proceeds to the next (eighth) step $S_8$.

At the eighth step $S_8$, the iris unit 6 is opened and the imaging devices 1R, 1G and 1B perform an imaging operation with light of uniform light intensity corresponding to 100 percent brightness falling on the whole of the imaging surfaces with the use of a white color pattern, such as a Porta pattern.

At the next (ninth) step $S_9$, the data processing circuit 17 processes the imaging output signals $E_R$, $E_G$ and $E_B$ produced by the imaging devices 1R, 1G and 1B with light of uniform light intensity corresponding to 100 percent brightness falling on the whole of the imaging surfaces, for forming white dark current correction data $D[W_{RSH}/W_{GSH}/W_{BSH}]$ on the basis of the dot-sequential data $D[R/G/B]$ and dot-sequentially storing the data in the working memory 18.

At the next (tenth) step $S_{10}$, the data processing circuit 17 reads out the black dark current correction data $D[B_{RSH}/B_{GSH}/B_{BSH}]$ and the white dark current correction data $D[W_{RSH}/W_{GSH}/W_{BSH}]$ from the working memory 18 dot-sequentially and processes the imaging output signals $E_R$, $E_G$ and $E_B$ from the imaging devices 1R, 1G and 1B by dark current correction processing effected by the correction circuit 3, while detecting white dark current correction errors of the shading corrected imaging output signals $E_R$, $E_G$ and $E_B$ by, for example, a least squares method.

At the next step $S_{11}$, it is determined whether the white dark current correction errors of the dark current corrected imaging output signals $E_R$, $E_G$ and $E_B$ detected at the tenth step $S_{10}$ are not larger than a predetermined value (threshold). If the result of the decision made at the step $S_{11}$ is NO, that is if the white dark current correction errors are larger than the predetermined value, the system controller proceeds to a step $S_{12}$ to control the gains of the variable gain amplifiers 9R, 9G and 9B of the correction circuit 3 in a direction to decrease the white dark current correction errors. Then, at the next step $S_{13}$, the system controller 27 sets all the white shading correction data $D[W_{RSH}/W_{GSH}/W_{BSH}]$ in the working memory 18 to 1, after which the system controller reverts to the step $S_9$ to repeat the operations from the step $S_9$ to the step $S_{13}$. If the result of the decision made at the step $S_{11}$ is YES, that is if the white dark current correction errors of the shading corrected imaging output signals $E_R$, $E_G$ and $E_B$ are not larger than the predetermined value, the operation of detecting the white dark current characteristics is terminated. The system controller 27 proceeds to a steps $S_{14}$ to perform white balance adjustment to terminate the control operation of the detection mode for detecting the dark current characteristics.

At the step $S_{14}$, with the imaging output signals $E_R$, $E_G$ and $E_B$ of the R, G and B channels, produced by the imaging devices 1R, 1G and 1B and white dark current corrected on the basis of the black shading correction data $D[B_{RSH}/B_{GSH}/B_{BSH}]$ and the white dark current correction data $D[W_{RSH}/W_{GSH}/W_{BSH}]$ fetched dot-sequentially into the working memory 13, as described previously, the system controller 27 sets the gains of the variable gain amplifiers 9R, 9G and 9B of the correction circuit 3 so that the imaging output concurrent data $D_R$, $D_G$ and $D_B$ of the respective channels will exhibit an equal signal level, thereby performing white balance adjustment.

The operation of detecting the dark current characteristics without any light being incident on the imaging surfaces of the imaging devices 1R, 1G and 1B, that is the black dark current characteristics, may be performed at any desired occasion of closing the iris unit 5. However, the operation of detecting the white dark current characteristics cannot be performed so frequently, because the imaging operation has to be performed with light of uniform light intensity with 100 percent brightness falling on the imaging surfaces of the imaging devices 1R, 1G and 1B with the use of a white color pattern, such as a Porta pattern. Therefore, the latest white dark current correction data as found by the detecting operation of the white dark current characteristics are preferably stored in the backup memory (EE-PROM) 19.

In general, the dark current characteristics of an imaging device are subject to larger changes in the marginal (peripheral) region of the imaging surface than at the middle of the imaging surface. For this reason, data may be eliminated periodically, so that the data volume is lesser at the middle of the imaging surface, for conserving the storage capacity of the backup memory 19. For example, the horizontal white dark current correction data $D[W_{RSH}/W_{GSH}W_{BSH}]_H$ may be subjected to down-sampling in such a manner that the number of data is reduced by factors of $\frac{1}{8}$ and 1/128 at the margin and at the middle of the imaging surface, respectively, while the vertical white dark current correction data $D[W_{RSH}/W_{GSH}/W_{BSH}]_V$ may be subjected to down-sampling in such a manner that the number of data is reduced by factors of $\frac{1}{4}$ and 1/32 at the margin and at the middle of the imaging surface, respectively.

In the present embodiment, the data processing circuit 17 is provided with a processing circuit 40 (FIG. 4) whereby the latest white dark current correction data $D[W_{RSH}/W_{GSH}/W_{BSH}]$ as found by the above-described detection operation for detecting the white dark current characteristics are read out from the working memory 18 and subjected to down-sampling to reduce the number of data stored in the backup memory 19 in that the white dark current correction data with the lesser data volume read out from the buffer memory 19 are interpolated and written in the working memory 18 via a buffer circuit 41 as the white dark current correction data.

The data reduction and interpolation effected in the processing circuit 40 may be implemented by a digital filter having a transfer function H(z) given by:

$$H(z) = \tfrac{1}{4}Z^{-4} + \tfrac{1}{2}Z^0 + \tfrac{1}{4}Z^4.$$

for sequentially providing the data rates through the filter equal to $\frac{1}{2}$ or 2 times.

Figures 6A, 6B:
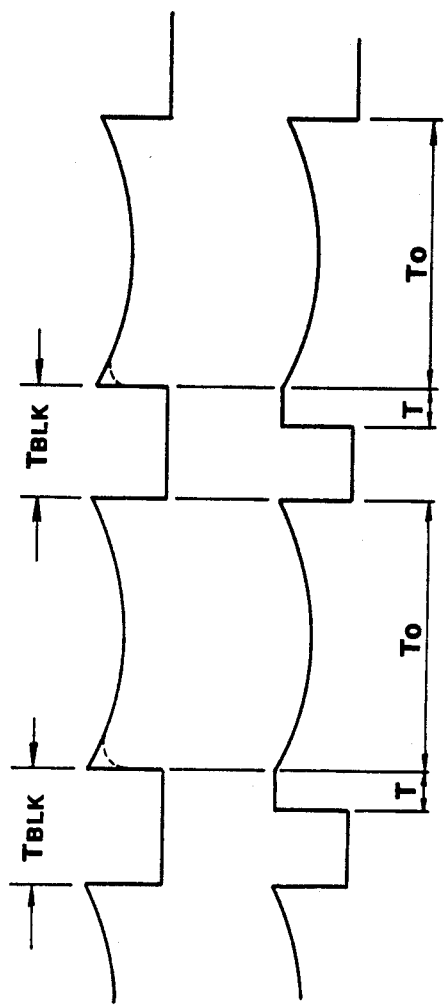
FIGS. 6a and 6b are waveform diagrams showing a dark current correction signal formed by the dark current correction signal forming section of the apparatus of FIG. 1.

It should be noted that, in the above-described dark current correction signal former 13, optimum correction occasionally cannot be achieved by the black dark current correction signals $B_{RSH}$, $B_{GSH}$ and $B_{BSH}$ of the R, G and B channels, supplied from the D/A converters 23R, 23G and 23B to the correction circuit 3 by way of the low-pass filters 25R, 25G and 25B, or by the white dark current correction signals $W_{RSH}$, $W_{GSH}$ and $W_{BSH}$ supplied from the D/A converters 24R, 24G and 24B to the correction circuit 3 by way of the low-pass filters 26R, 26G and 26B, because the rising and falling edges thereof tend to become dull or rounded (that is, to lose their sharpness or abruptness) due to the filter characteristics of the low-pass filters 25R, 25G, 25B, 26R, 26G and 26B, as shown by broken lines at (A) in FIG. 6. For this reason, with the dark current correction signal former 14 of the present embodiment, when reading out the above-mentioned horizontal black dark current correction data $D[B_{RSH}/B_{GSH}/B_{BSH}]_H$ and white dark current correction data $D[W_{RSH}/W_{GSH}W_{BSH}]_H$ from the working memory 18, the reading start time of the leading data in each line is advanced repeatedly into each successive blanking interval $T_{BLK}$ by a predetermined time interval or period T as shown at (B) in FIG. 6, so that the leading data in each line is read out from the working memory 18 repeatedly during the intervals or periods T, in order to ensure optimum correction by preventing the occurrence of a situation in which the adverse waveform distortion effects caused by the filter characteristics of the low-pass filters 25R, 25G, 25B, 26R, 26G and 26B are displayed during the regular correction time interval $T_O$.

Instead of controlling the reading out of data from the working memory 18 as described above, it is possible to prevent waveform distortion due to the filter characteristics of the low-pass filters 25R, 25G, 25B, 26R, 26G and 26B by controlling the writing of data to the working memory 18.

A way in which such control of writing to the working memory 18 may be achieved will now be described with reference to FIG. 6.

When detecting the white dark current characteristics, data having the same level as levels just behind (after) the blanking intervals $T_{BLK}$ of the output signals from the A/D converters 12R, 12G and 12B are written into the working memory 18 during the periods T. White dark current correction data are thus stored in (written into) the working memory 18 during the periods $T_O$.

When imaging, that is when picking up an image, data read out from an address or addresses of the working memory 18 corresponding to the periods T and the white dark current correction data as read out from an address or addresses of the working memory 18 corresponding to the periods $T_O$ are supplied to the low-pass filters 26R, 26G and 26B via the D/A converters 24R, 24G and 24B. In this way, it is possible to prevent waveform distortion caused by the filter characteristics of the low-pass filters 26R, 26G and 26B.

The control of writing data to and reading data from the working memory 18 is performed by the system controller 27.

Black dark current correction may be carried out in the above case in the same way as that in which white dark current correction is effected.

With the above-described shading correction apparatus of the present embodiment, dark current correction data for each of the imaging devices 1R, 1G and 1B are formed from the imaging output data $D_R$, $D_G$ and $D_B$, digitized by the A/D converters 12R, 12G and 12B of the R, G and B channels from the imaging output signals $E_R$, $E_G$ and $E_B$ from the first, second and third imaging devices 1R, 1G and 1B as light exposure controlled by the iris unit 5, and the so-formed dark current correction data are stored in the working memory 18 constituted by a RAM. Then, during actual imaging, that is when dark current correction signals for each of the imaging devices 1R, 1G and 1B are formed on the basis of the dark current correction data read out from the working memory 18 so that the imaging output signals $E_R$, $E_G$ and $E_B$ from the imaging devices 1R, 1G and 1B may be automatically subjected to dark current correction processing.

In addition, with the above-described dark current correction apparatus, the state of light exposure of the first, second and third imaging devices 1R, 1G and 1B is controlled, on the one hand, by the iris unit 5 so that no light will be incident on the imaging surfaces of the first, second and third imaging devices 1R, 1G and 1B and, under the thus-controlled state of light exposure, the black dark current correction data $D[B_{RSH}]$, $D[B_{GSH}]$ and $D[B_{BSH}]$ for each of the imaging devices 1R, 1G and 1B are formed from the imaging output data $D_R$, $D_G$ and $D_B$ digitized from the imaging output signals $E_R$, $E_G$ and $E_B$ of the imaging devices 1R, 1G and 1B by the A/D converters 12R, 12G and 12B of the R, G and B channels. On the other hand, the state of light exposure of the first, second and third imaging devices 1R, 1G and 1B is controlled by the iris unit 5 so that light of uniform light intensity will be incident on the whole of the imaging surfaces of the first, second and third imaging devices 1R, 1G and 1B and, under the thus-controlled state of light exposure, the white dark current correction data $D[W_{RSH}]$, $D[W_{GSH}]$ and $D[W_{BSH}]$ for each of the imaging device 1R, 1G and 1B are formed from the imaging output data $D_R$, $D_G$ and $D_B$ of the R, G and B channels digitized from the imaging output signals $E_R$, $E_G$ and $E_B$ of the imaging devices 1R, 1G and 1B. These black dark current correction data $D[B_{RSH}]$, $D[B_{GSH}]$ and $D[B_{BSH}]$, as well as the white dark current correction data $D[W_{RSH}]$, $D[W_{GSH}]$ and $D[W_{BSH}]$, are stored in the working memory 18. Then, during actual imaging, the black dark current correction signals $B_{RSH}$, $B_{GSH}$ and $B_{BSH}$, as well as the white dark current correction signals $W_{RSH}$, $W_{GSH}$ and $W_{BSH}$, are formed on the basis of the black current correction data $D[B_{RSH}]$, $D[B_{GSH}]$ and $D[B_{BSH}]$ as well as the white current correction data $D[W_{RSH}]$, $D[W_{GSH}]$ and $D[W_{BSH}]$, read out from the working memory 18, so that the imaging output signals $E_R$, $E_G$ and $E_B$ of the imaging devices 1R, 1G and 1B may be quickly and reliably subjected to black current correction processing and white current correction processing.

Also, with the above-described current correction apparatus, the imaging output data digitized from the imaging output signals $E_R$, $E_G$ and $E_B$ of the first, second and third imaging devices 1R, 1G and 1B with no light falling on the respective imaging surfaces are processed into dot-sequential black current correction data $D[B_{RSH}/B_{GSH}/B_{BSH}]$ with the data volume reduced to one eighth of the original data volume. On the other hand, the imaging output data $D_R$, $D_G$ and $D_B$ digitized from the imaging output signals $E_R$, $E_G$ and $E_B$ with light of uniform intensity falling on the full imaging surfaces of the imaging devices are processed into the white current correction data $D[W_{RSH}/W_{GSH}/W_{BSH}]$ with the data volume reduced to one eighth of the original data volume. This results in a reduced current correction data volume. In addition, since these dot-sequential black current correction data $D[B_{RSH}/B_{GSH}/B_{BSH}]$ and white current correction data $D[W_{RSH}/W_{GSH}/W_{BSH}]$ are stored collectively in the working memory 18, the various current correction data necessary for shading correction of the imaging devices may be stored in a single memory without the necessity of providing plural memory means for storing black and white shading correction data for the imaging devices.

Further, with the current correction apparatus of the present embodiment, since the level data of the imaging output signals $E_R$, $E_G$ and $E_B$ of the pixels of the imaging devices 1R, 1G and 1B, digitized more for each of the imaging devices 1R, 1G and 1B from the imaging output data $D_R$, $D_G$ and $D_B$ as digitized by the A/D converters 12R, 12G and 12B of the R, G and B channels, are integrated in the horizontal and vertical directions for forming the black current correction data $D[B_{RSH}/B_{GSH}/B_{BSH}]_H$ and the white current correction data $D[W_{RSH}/W_{GSH}/W_{BSH}]_H$ consistent with the horizontal current component as well as the black current correction data $D[B_{RSH}/B_{GSH}/B_{BSH}]_V$ and the white dark current correction data $D[W_{RSH}/W_{GSH}/W_{BSH}]_V$ consistent with the vertical dark current component, as the dark current correction data, the data volume of the shading correction data used for shading correction may be reduced to enable the dark current correction data to be stored in a working memory 18 of reduced storage capacity.

In addition, with the above-described dark current correction apparatus, by providing the working memory 18 constituted by a RAM and the backup memory 19 constituted by an EEPROM, as the storage means for storing the dark current correction data, it becomes possible to perform the operation of dark current correction data generation or shading correction on the basis of the dark current correction data with the aid of the working memory 18, while it becomes possible to store the dark current correction data for a prolonged time using the backup memory 19. Also, since the dark current correction data stored in the backup memory 19 are previously reduced in data volume so that the number of output data is less at the middle than at the margin of the imaging surfaces of the imaging devices, an EE- PROM which has a lesser storage capacity, and thus is less expensive, may be employed.

The invention is not limited to the above-described embodiment. For example, instead of processing the imaging output signals $E_R$, $E_G$ and $E_B$ of the first, second and third imaging devices 1R, 1G and 1B by analog dark current correction processing by means of the correction circuit 3, as in the above-described embodiment, it is possible to provide a digital dark current correction circuit downstream of the A/D converters 12R, 12G and 12B of the R, G and B channels and to supply the black dark current correction data $D[B_{RSH}]$, $D[B_{GSH}]$ as well as the white dark current correction data $D[W_{RSH}]$, $D[W_{GSH}]$ and $D[W_{BSH}]$ to the digital correction circuit by means of the data selectors 20 and 21.

With the above-described dark current correction apparatus embodying the invention, the level data of imaging output signals of a predetermined number of pixels, digitized by analog/digital converting means from the imaging output signals of the imaging devices controlled as regards light exposure by light exposure control means, are stored as dark current correction data in memory means, and shading correction signals are formed on the basis of the dark current correction data read out from the storage means, during actual imaging, thereby enabling the imaging output signals of the imaging devices automatically to be subjected to dark current correction processing.

In addition, with the above-described dark current correction apparatus embodying the invention, the state of light exposure is controlled by the light exposure control means such that no light will be incident on the imaging surfaces of the imaging devices, and black dark current correction data are produced from the imaging output data digitized from the imaging output signals of the imaging devices in the thus-controlled state of light exposure, thereby enabling the imaging output signals of the imaging devices to be subject to black dark current correction processing quickly and reliably during actual imaging.

Further, with the dark current correction apparatus according to the above embodiment, the state of light exposure is controlled by the light exposure control means so that light of uniform light intensity will be incident on the entirety of the imaging surfaces of the imaging devices, and white dark current correction data are produced from imaging output data digitized from imaging output signals of the imaging devices in the thus-controlled state of light exposure, thereby enabling the imaging output signals of the imaging devices to be subjected to white dark current correction quickly and reliably during actual imaging.

Also, with the dark current correction apparatus according to the above embodiment of the invention, by providing the random access memory (RAM) and the electrically erasable programmable read only memory (EEPROM) as storage means, the operation of forming the dark current correction data or correcting the dark current by means of the dark current correction data may be performed using the RAM as a working memory, while the dark current correction data may be stored for a prolonged time using the EEPROM as a backup memory. Further, the dark current correction data stored in the programmable read-only memory have been reduced in data volume so that the number of output data is less at the middle than at the margin of the imaging surface of each imaging device, so that it becomes possible to use memory of a smaller storage capacity.

A shading correction apparatus according to a second embodiment of the invention will now be described in detail with reference to FIGS. 7 to 12 of the drawings. The apparatus of FIGS. 7 to 12 is similar in many respect to that of FIGS. 1 to 6.

The dark current correction circuit according to the present embodiment is operative to eliminate a shading component in an imaging output signal of an imaging device 101 having an array of a large number of pixels arranged in a matrix configuration and, as shown in FIG. 7, the apparatus comprises a correction circuit 103 for processing the imaging output signal from the imaging device 101 by dark current correction processing, an analog to digital (A/D) converter 105 for converting the output signal of the correction circuit 103 into a digital signal, and a dark current correction signal forming section 110 for forming a dark current correction signal (or signals) on the basis of output data from the A/D converter 105.

The imaging device 101 used with the present embodiment is a CCD image sensor in which a number ($M \times N$) of pixels $S_{11}$ to $S_{MN}$ are arrayed in a matrix configuration comprising a number M of horizontal rows of pixels and a number N of vertical columns of pixels. The imaging device 110 is driven by a CCD driving unit (not shown) so that signal charges for the totality of the pixels $S_{11}$ to $S_{MN}$ constituting a field or frame is read out during one vertical scanning period. The sequential signal charges read out from the imaging device 101 are supplied as an imaging output signal via a preamplifier 102 to the correction circuit 103.

An iris unit 109 controlled by an iris control circuit or driver 108, which is in turn controlled by a system controller 107, is provided ahead of an imaging surface of the imaging device 101.

The correction circuit 103 subjects the imaging output signal from the imaging device 101 to dark current correction processing by using the dark current correction signal supplied by the dark current correction signal forming section 110, and is constituted by, for example, a subtractor (not shown) for subtracting the dark current correction signal from the imaging output signal and a divider (not shown) for dividing the imaging output signal by the dark current correction signal.

The output signal from the correction circuit 103 is supplied via a preknee circuit 104 to the A/D converter 105. The preknee circuit 104 effects non-linear processing of the output signal from the correction circuit 103 to prevent the input signal level to the A/D converter 105 exceeding the dynamic range thereof.

The A/D converter 105 processes the output signal of the correction circuit 103, as supplied via the preknee circuit 104, to form level data indicating the signal level of the output signal. The level data produced by the A/D converter 105 are supplied as dark current corrected imaging output data to the dark current correction signal forming section 110, and to downstream signal processing circuits (not shown), via a defect correction circuit 106.

The defect correction circuit 106 processes signal charges, that is parts of the imaging output signal, from defective pixels of the imaging device 101, by defect correction processing that corrects the signal level of the imaging output signal. The circuit 106 performs the defect correction processing on the basis of previously detected defective pixel data of the imaging device 101.

The dark current correction signal forming circuit 110 of the present embodiment is constituted by: a sampling circuit 111 for sampling level data supplied from the A/D converter 105 via the defect correction circuit 106 at a predetermined sampling interval; an arithmetic unit or device or central processor unit (CPU) 112 supplied with sampled data from the sampling circuit 111; a memory 113 connected to the arithmetic device 112; sawtooth (serrated) signal generators 114H, 114V for generating sawtooth signals at the horizontal scanning period and the vertical scanning period, respectively; parabolic signal generators 115H, 115V for generating parabolic signals at the horizontal scanning period and the vertical scanning period, respectively; level controllers (level control circuits) 116H, 116V for controlling the signal levels of the sawtooth signals from the sawtooth signal generators 114H, 114V; level controllers (level control circuits) 117H, 117V for controlling the signal levels of the parabolic signals from the parabolic signal generators 115H, 115V; and adders 118H, 118V and 118 for summing together the sawtooth signals and the parabolic signals.

The dark current correction signal forming section 110 is controlled by the system controller 107 to be switched between a dark current detection mode of operation and a dark current correcting mode of operation.

For black dark current detection during the shading detecting mode of operation, the iris unit 109 provided ahead of the imaging surface of the imaging device 101 is closed by the iris control circuit 108 (in turn controlled by the system controller 107) so that an imaging operation is performed without any light falling on the imaging surface. For white dark current detection, the iris unit 109 is opened by the iris control circuit 108 (in turn controlled by the system controller 107) and an imaging operation is performed under a condition such that, with the use of a white pattern, such as a Porta pattern, light of uniform light intensity will be incident on all of the imaging surface. The imaging output signal obtained from the imaging device 101 during the dark current detecting mode is supplied via the preknee circuit 104 to the A/D converter 105 in an uncorrected state, that is without being subjected to dark current correction processing by the correction circuit 103.

Figure 8:
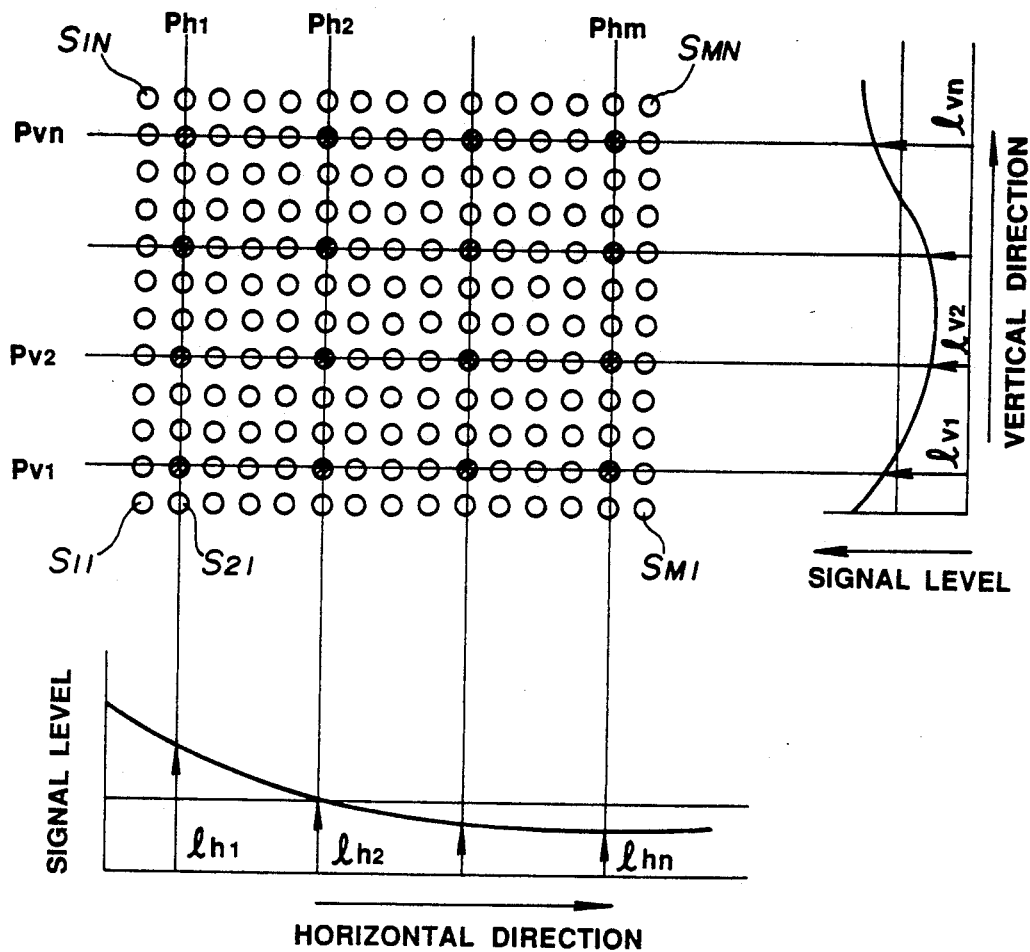
FIG. 8 is an illustrative view showing an array of pixels of a solid-state imaging device supplying an imaging output signal to the dark current correction apparatus of FIG. 7, and exemplary dark current characteristics thereof in the horizontal and vertical directions.

The sampling circuit 111 processes the level data supplied from the A/D converter 105 via the defect correction circuit 106 by sampling, from the imaging output signal constituted by the signal charges of the pixels $S_{11}$ to $S_{MN}$ of the imaging device 101, level data of the imaging output signal from the signal charges of a number (m×n) of pixels composed of a number m of horizontal rows of pixels and a number n of vertical columns of pixels, as shown by hatching in FIG. 8, and cumulatively adding the level data of the imaging output signal for pixels lying at the same positions $P_{h1}$ to $P_{hm}$ in the horizontal direction, thereby forming a first data string $D[1_{h1}$ to $1_{hm}]$ indicative of dark current characteristics in the horizontal direction, and also cumulatively adding the level data of the imaging output signal for pixels lying at the same positions $P_{v1}$ to $P_{vm}$ in the vertical direction, thereby forming a second data string $D[1_{v1}$ to $1_{vm}]$ indicative of dark current characteristics in the vertical direction.

The signal to noise (S/N) ratio of the level data may be improved by using a cumulative sum of level data of the imaging output signal corresponding to the pixels lying at the same positions in the horizontal or vertical direction. The S/N ratio of the level data may be further improved by synchronized addition on a frame-by-frame basis.

It is to be noted that, in the present embodiment, the sampling circuit 111 forms first and second data strings $D[1_{h1}$ to $1_{hm}]_B$ and $D[1_{v1}$ to $1_{vm}]_B$, indicative of black dark current characteristics detected from the imaging output signal obtained from the imaging device 101 by carrying out imaging without any light falling on the imaging surface, and forms first and second data strings $D[1_{h1}$ to $1_{hm}]_W$ and $D[1_{v1}$ to $1_{vm}]_W$, indicative of white dark current characteristics detected from the imaging output signal obtained by carrying out the imaging operation with light of uniform light intensity incident on all of the imaging surface, and transmits these data strings to the arithmetic device 112 for storage in the memory 113.

The arithmetic device 112 calculates, from the black dark current characteristics indicated by the first and second data strings $D[1_{h1}$ to $1_{hm}]_B$ and $D[1_{v1}$ to $1_{vm}]_B$ stored in the memory 113, a quadratic curve indicating a dark current waveform in the horizontal direction and another quadratic curve indicating a dark current waveform in the vertical direction. The arithmetic device 112 also calculates, from the white dark current characteristics indicated by the first and second data strings $D[1_{h1}$ to $1_{hm}]_W$ and $D[1_{v1}$ to $1_{vm}]_W$ stored in the memory 113, a quadratic curve indicating a dark current waveform in the horizontal direction and another quadratic curve indicating a dark current waveform in the vertical direction.

The arithmetic operation performed by the arithmetic device 112 to find the quadratic curves may comprise fitting a quadratic curve ($y = ax^2 + bx + c$) to the data strings obtained in the above-described manner by the sampling circuit 111 by a least squares method.

Thus, the sum of the squares of the deviations or errors E when the curve $y = ax^2 + bx + c$ is fitted to a number r of waveform sampling data $(x_1, y_1), (x_2, y_2), \ldots, (x_r, y_r)$ is given by $$E = \sum_{i=1}^{r} \{y_i - (ax_i^2 + bx_i + c)\}^2. \tag{1}$$

For minimizing the sum of the squares of the errors E, it suffices if $$\frac{\partial E}{\partial a} = 0, \tag{2}$$

$$\frac{\partial E}{\partial b} = 0$$

$$\frac{\partial E}{\partial c} = 0$$

that is if the results of partial differentiation of E with respect to coefficients a, b and c are equal to zero.

The coefficients a and b may be represented by the equations $$a = \frac{C_1 \sum_{i=1}^{r} y_i + C_2 \sum_{i=1}^{r} x_i y_i + C_3 \sum_{i=1}^{r} x_i^2 y_i}{C_0}, \text{ and} \tag{3}$$

-continued
$$b = \frac{C_4 \sum_{i=1}^{r} y_i + C_5 \sum_{i=1}^{r} x_i y_i + C_6 \sum_{i=1}^{r} x_i^2 y_i}{C_0}. \quad (4)$$

The coefficients $C_0$ to $C_6$ in Equations (3) and (4) are given by:

$$C_0 = \sum_{i=1}^{r} x_i^4 \sum_{i=1}^{r} x_i^2 \sum_{i=1}^{r} x_i \sum_{i=1}^{r} 1 + \\ 2 \sum_{i=1}^{r} x_i^3 \sum_{i=1}^{r} x_i^2 \left(\sum_{i=1}^{r} x_i\right)^2 - \quad (5)$$

$$\sum_{i=1}^{r} x_i^4 \left(\sum_{i=1}^{r} x_i\right)^3 - \left(\sum_{i=1}^{r} x_i^3\right)^2 \sum_{i=1}^{r} x_i \sum_{i=1}^{r} 1 - \\ \sum_{i=1}^{r} x_i^3 \left(\sum_{i=1}^{r} x_i^2\right)^3 \sum_{i=1}^{r} x_i, \quad (6)$$

$$C_1 = \sum_{i=1}^{r} x_i^3 \left(\sum_{i=1}^{r} x_i\right)^2 - \left(\sum_{i=1}^{r} x_i^2\right)^2 \sum_{i=1}^{r} x_i, \quad (7)$$

$$C_2 = \sum_{i=1}^{r} x_i^2 \left(\sum_{i=1}^{r} x_i\right)^2 - \sum_{i=1}^{r} x_i^3 \sum_{i=1}^{r} x_i \sum_{i=1}^{r} 1, \quad (8)$$

$$C_3 = \sum_{i=1}^{r} x_i^2 \sum_{i=1}^{r} x_i \sum_{i=1}^{r} 1 - \left(\sum_{i=1}^{r} x_i\right)^3, \quad (9)$$

$$C_4 = \sum_{i=1}^{r} x_i^3 \sum_{i=1}^{r} x_i^2 \sum_{i=1}^{r} x_i - \sum_{i=1}^{r} x_i^4 \left(\sum_{i=1}^{r} x_i\right)^2, \quad (10)$$

$$C_5 = \sum_{i=1}^{r} x_i^4 \sum_{i=1}^{r} x_i \sum_{i=1}^{r} 1 - \left(\sum_{i=1}^{r} x_i^2\right)^2 \sum_{i=1}^{r} x_i, \text{ and} \quad (11)$$

$$C_6 = \sum_{i=1}^{r} x_i^2 \left(\sum_{i=1}^{r} x_i\right)^2 - \sum_{i=1}^{r} x_i^3 \sum_{i=1}^{r} x_i \sum_{i=1}^{r} 1.$$

If an equal sampling interval is used, and $x_i$ is normalized, $x_i = i$, so that the coefficients $C_0$ to $C_6$ in Equations (3) and (4) become functions of n. With a sampling interval of s, the coefficients a and b may be expressed by the equations $$a = \frac{C_1 \sum_{i=1}^{r} y_i + C_2 \sum_{i=1}^{r} i y_i + C_3 \sum_{i=1}^{r} i^2 y_i}{C_0^2}, \text{ and} \quad (12)$$

$$b = \frac{C_5 \sum_{i=1}^{r} y_i + C_6 \sum_{i=1}^{r} i y_i + C_7 \sum_{i=1}^{r} i^2 y_i}{C_4}. \quad (13)$$

The coefficients $C_0$ to $C_7$ in Equations (12) and (13) above have been reduced and, for the members r of the sampling data, assume for example the values shown in the following table:

TABLE

| number of data n | coefficients | | | | | | | |
|---|---|---|---|---|---|---|---|---|
| | $C_0$ | $C_1$ | $C_2$ | $C_3$ | $C_4$ | $C_5$ | $C_6$ | $C_7$ |
| 1 | 0 | 0 | 0 | 0 | 0 | 0 | 0 | 0 |
| 2 | 0 | 6 | −9 | 3 | 0 | −18 | 27 | −9 |
| 3 | 2 | 10 | −12 | 3 | 2 | −42 | 49 | −12 |
| 4 | 4 | 5 | −5 | 1 | 20 | −135 | 129 | −25 |
| 5 | 14 | 7 | −6 | 1 | 70 | −231 | 187 | −30 |
| 6 | 112 | 28 | −21 | 3 | 560 | −1092 | 767 | −105 |
| 7 | 84 | 12 | −8 | 1 | 84 | −108 | 67 | −8 |
| 8 | 168 | 15 | −9 | 1 | 168 | −153 | 85 | −9 |
| 9 | 924 | 55 | −30 | 3 | 4620 | −3135 | 1577 | −150 |
| 10 | 528 | 22 | −11 | 1 | 2640 | −1386 | 637 | −55 |
| 11 | 858 | 26 | −12 | 1 | 1430 | −598 | 253 | −20 |
| 12 | 4004 | 91 | −39 | 3 | 4004 | −1365 | 535 | −39 |
| 13 | 2002 | 35 | −14 | 1 | 2002 | −567 | 207 | −14 |
| 14 | 2912 | 40 | −15 | 1 | 14560 | −3480 | 1189 | −75 |
| 15 | 12376 | 136 | −48 | 3 | 61880 | −12548 | 4061 | −240 |

The arithmetic device 112 calculates coefficients $a_{HB}$ and $b_{HB}$ of the quadratic curve fitted to the horizontal dark current waveform of the black dark current characteristics, indicated by the first and second data strings $D[l_{h1}$ to $l_{hm}]_B$ and $D[l_{v1}$ to $l_{vm}]_B$ stored in the memory 113, and coefficients $a_{VB}$ and $b_{VB}$ of the quadratic curve fitted to the vertical dark current waveform of the black shading characteristics, and stores these coefficients $a_{HB}$, $b_{HB}$, $a_{VB}$ and $b_{VB}$ in the memory 113. Also, the arithmetic device 112 calculates coefficients $a_{HW}$ and $b_{HW}$ of the quadratic curve fitted to the horizontal dark current waveform of the white dark current characteristics, indicated by the first and second data strings $D[l_{h1}$ to $l_{hm}]_W$ and $D[l_{v1}$ to $l_{vm}]_W$ stored in the memory 113, and coefficients $a_{VW}$ and $b_{VW}$ of the quadratic curve fitted to the vertical dark current waveform of the white shading characteristics, and stores these coefficients $a_{HW}$, $b_{HW}$, $a_{VB}$ and $b_{VB}$ in the memory 113.

In this manner, during the dark current detecting mode of operation, that is the mode of detecting the dark current characteristics, the arithmetic device 112 calculates the coefficients $a_{HB}$, $b_{HB}$, $a_{VB}$ and $b_{VB}$ of the quadratic curves fitted to the shading waveforms in the horizontal and vertical directions of the black dark current characteristics, and the coefficients $a_{HW}$, $b_{HW}$, $a_{VW}$ and $b_{VW}$ of the quadratic curves fitted to the dark current waveforms in the horizontal and vertical directions of the white dark current characteristics, and stores these coefficients in the memory 113.

When the system controller then causes the dark current correcting mode of operation, that is the mode of correcting the dark current characteristics, to be entered, the arithmetic unit 112 reads out from the memory 113 the coefficients $a_h$, $b_h$, $a_V$ and $b_V$ stored in the memory 113 during operation of the mode of detecting the dark current characteristics, and transmits these coefficients to the level controllers 116H, 117H, 116V and 117V.

The level controller 116H processes the sawtooth signal for the horizontal scanning period, outputted by the sawtooth signal generator 114H, in accordance with a level control operation consistent with the coefficient $b_H$ of the first order term of the quadratic curve fitted to the dark current waveform in the horizontal direction of the dark current characteristics.

The level controller 117H processes the parabolic signal of the horizontal scanning period, outputted by the parabolic signal generator 115H, in accordance with a level control operation consistent with the coefficient $a_H$ of the second order term of the quadratic curve fitted to the dark current waveform in the horizontal direction.

The level controller 116V processes the sawtooth signal for the vertical scanning period, outputted from the sawtooth signal generator 114V, in accordance with a level control operation consistent with the coefficient $b_V$ of the first order term of the quadratic curve fitted to the dark current waveform in the vertical direction of the dark current characteristics.

The level controller 117V processes the parabolic signal for the vertical scanning period, outputted by the parabolic signal generator 115V, in accordance with a level control operation consistent with the coefficient $a_V$ of the second order term of the quadratic curve fitted to the dark current waveform in the vertical direction.

The adder 118H sums together the sawtooth signal processed by the level control circuit 116H in accordance with the level control operation consistent with the coefficient $b_H$, and the parabolic signal processed by the level control circuit 117H in accordance with the level control operation consistent with the coefficient $a_H$, to form a dark current correction signal for the horizontal direction. The adder 118V sums together the sawtooth signal processed by the level control circuit 116V in accordance with the level control operation consistent with the coefficient $b_V$, and the parabolic signal processed by the level control circuit 117V in accordance with the level control operation consistent with the coefficient $a_V$, to form a dark current correction signal for the vertical direction. The adder 118 sums the horizontal and vertical dark current correction signals, formed as described above by the adders 118H and 118V, respectively, to form a dark current correction signal for the entire frame. The dark current correction signal thereby formed by the adder 118 is supplied to the correction circuit 103.

In the present embodiment, the dark current correction signal forming section 110 includes a processing system for forming a black dark current correction signal on the basis of the coefficients $a_{HB}$, $b_{HB}$, $a_{VB}$ and $b_{VB}$ of the curves approximating to the black dark current waveform, and a processing system for forming a white dark current correction signal on the basis of the coefficients $a_{HW}$, $b_{HW}$, $a_{VW}$ and $b_{VW}$ of the curves approximating to the white dark current waveform. The black dark current correction signal and the white dark current correction signal are supplied to the correction circuit 103.

The correction circuit 103 processes the imaging output signal supplied by the imaging device 101 via the preamplifier 102 by adding the above-mentioned black dark current correction signals thereto to perform black dark current correction. The circuit 103 also processes the imaging output signal supplied by the imaging device 101 by multiplying it by the white dark current correction signal to perform white dark current correction. The imaging output signal thus subjected by the correction circuit 103 to black dark current correction processing and white dark current correction processing is digitized by the A/D converter 105 so as to be supplied as dark current corrected imaging output data to the downstream signal processing circuits (not shown).

It is to be noted that the circuit construction of the sawtooth signal generators 114H, 114V, as well as of the parabolic signal generators 115H, 115V, would be simpler if use were made of a digital design or a configuration other than of generators used in an analog design or a configuration using operational amplifiers or gain control amplifiers.

Figure 9:
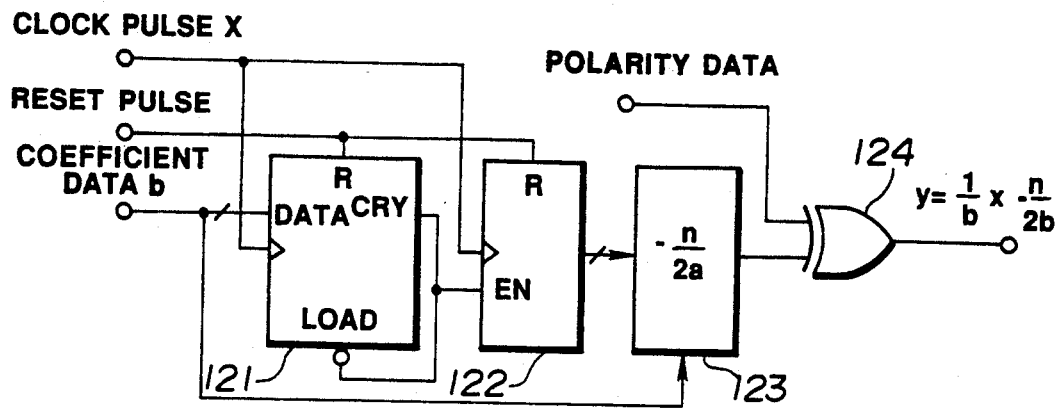
FIG. 9 is a block diagram showing an exemplary sawtooth signal generating circuit of a digital circuit configuration that can be employed in the dark current correction apparatus of FIG. 7.

A digital design of the sawtooth signal generators 114H and 114V may be achieved by using counters. For example, as shown in FIG. 9, a digital design for each of the sawtooth generators 114H and 114V may be achieved by using first and second counters 121, 122, a subtraction circuit (subtractor) 123 and an exclusive OR circuit 124. The counters 121, 122 of the sawtooth signal generators are reset (at reset inputs R thereof) by reset pulses at the repetition period of the output sawtooth signal to count clock pulses X at a repetition period corresponding to the pixel pitch. That is, for forming the sawtooth signal for the horizontal scanning period, the counters 121, 122 are reset by rest pulses at the horizontal scanning period for counting clock pulses at a repetition period corresponding to the pixel pitch in the horizontal direction. For forming the sawtooth signal at the vertical scanning period, the counters 121, 122 are reset by reset pulses at the vertical scanning period for counting clock pulses at a repetition period corresponding to the pixel pitch in the vertical direction, that is the horizontal scanning period.

The first counter 121 has a carry output terminal (CRY) thereof connected to a load input terminal (LOAD) thereof, and coefficient data supplied to a data input terminal (DATA) thereof are loaded at the timing of the carry output. The coefficient data represent the gradient or inclination of the output sawtooth signal. The coefficients $b_{HB}$, $b_{VB}$, $b_{HW}$ and $b_{VW}$, calculated by the arithmetic device 112 during the mode of detecting the shading characteristics, are used as the coefficient data. The first counter 121 transmits the carry output to an enable input terminal (EN) of the second counter 122 at a repetition period consistent with the loaded coefficient data.

Figure 10:
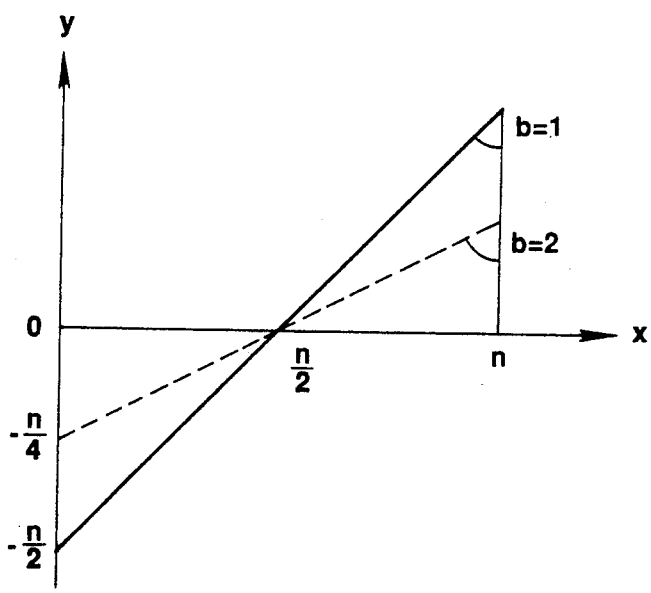
FIG. 10 is a graph showing output characteristics for use in describing the operation of the sawtooth signal generating circuit shown in FIG. 9.

The second counter 122 counts the clock pulses X each time a carry output of the first counter 121 is supplied to the enable input terminal of the counter 122 to output sawtooth signal data $y_{SW}$ having a gradient 1/b corresponding to the coefficient data b. The sawtooth signal data $y_{SW}$, formed by the second counter 122, are supplied to the subtractor 123, in which the value n/2b is subtracted from the data $y_{SW}$ to remove the d c component and provide a sawtooth signal output as shown in FIG. 10 (FIG. 10 shows two such signals, namely one for b=1, represented by a full line, and one for b=2, represented by a dashed line.)

The above-mentioned value n stands for the total number of pixels per scanning line when the sawtooth signal at the horizontal scanning period is to be formed, and the total number of pixels in each frame when the sawtooth signal at the vertical scanning period is to be formed.

The sawtooth signal data $y_{SWO}$, thus freed of the d c component by the subtractor 123, and represented by $$y_{SWO} = \frac{1}{b} x - \frac{n}{2b}, \quad (14)$$

is outputted, after polarity data are provided thereto in the exclusive OR circuit 124.

Figure 11:
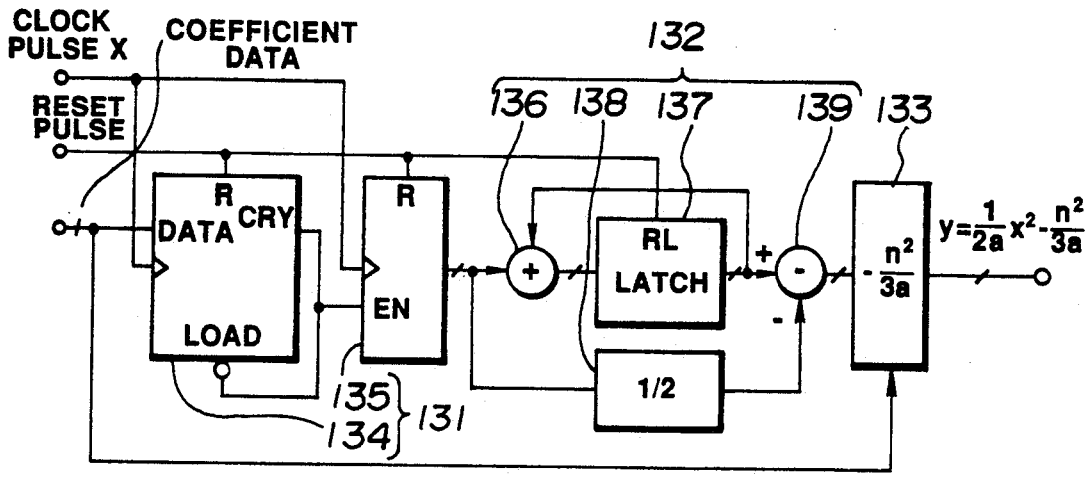
FIG. 11 is a block diagram showing an exemplary parabolic signal generating circuit of a digital circuit configuration that can be employed in the dark current correction apparatus of FIG. 7.

A digital configuration or design for each of the parabolic signal generators 115H, 115V may be achieved, as shown by way of example in FIG. 11, by using a sawtooth signal generator 131, an integrating circuit 132 and a subtraction circuit 133.

The sawtooth signal generator 131 is constituted by a first counter 134, which has a data input terminal (DATA) thereof supplied with coefficient data representing the gradient of the output sawtooth signal, and a second counter 135, which has an enable input terminal (EN) thereof supplied with a carry output (CRY) of the first counter 134. The counters 134, 135 are reset (at reset inputs R thereof) by reset pulses at the repetition period of the parabolic signals generated by the parabolic signal generator of digital configuration to count clock pulses X at a repetition period corresponding to the pixel pitch. Thus, when forming the parabolic signal at the horizontal scanning period, the counters 134, 135 are reset by reset pulses at the horizontal scanning period to count clock pulses of a repetition period corresponding to the horizontal pixel pitch. On the other hand, when forming the parabolic signal at the vertical scanning period, the counters 134, 135 are reset by rest pulses at the vertical scanning period to count clock pulses of a repetition period corresponding to the pixel pitch in the vertical direction, that is the vertical scanning period.

The first counter 134 has its carry output terminal (CRY) connected to a load input terminal (LOAD) thereof, and the input coefficient data supplied to its data input terminal (DATA) is loaded at the timing of the carry output. The coefficient data, as mentioned above, represent the gradient or inclination of the output sawtooth signal. The coefficients $a_{HB}$, $a_{VB}$, $a_{HW}$ and $a_{VW}$, calculated by the arithmetic unit 112 during the mode of detecting the dark current characteristics, are used as the coefficient data. The counter 134 transmits the carry output to the enable input terminal (EN) of the second counter 135 at a repetition period consistent with the loaded coefficient data.

The second counter 135 counts the clock pulses X each time a carry output of the first counter 124 is supplied to the enable input terminal of the counter 135 to output sawtooth signal data $y_{SW}$, represented by the equation $$y_{SW} = \frac{1}{a} X, \quad (15)$$

having a gradient 1/a consistent with the coefficient data a.

Figure 12:
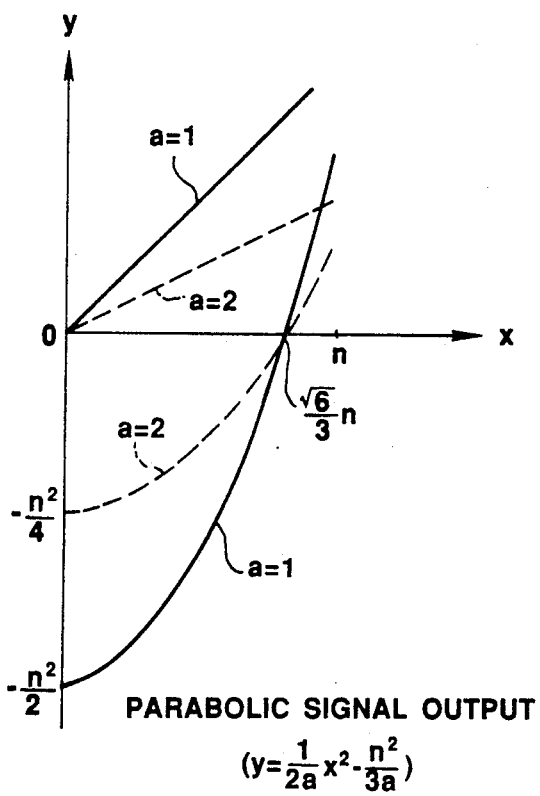
FIG. 12 is a graph showing output characteristics for use in describing the operation of the parabolic signal generating circuit shown in FIG. 11.

The sawtooth signal outputted by the sawtooth signal generator 131 is shown by a straight line in FIG. 12. (More precisely, two such sawtooth signals are shown in FIG. 12, namely one for a=1, represented by a full straight line, and one for a=2, represented by a dashed straight line.)

The integrating circuit 132 for integrating the sawtooth signal data $y_{SW}$ from the sawtooth signal generator 131 is constituted by an adder (addition circuit) 136 supplied with the data $y_{SW}$, a latch (latch circuit) 137 for latching an addition output from the adder 136, and a subtractor (subtraction circuit) 139 supplied with the data $y_{SW}$ via a ½ (one half) multiplier 138. The latch 137 transmits latch output data thereof to the adder 136 and to the subtractor 139.

In operation of the above-described integration circuit 132, the adder 136 adds the sawtooth signal data $y_{SW}$ from the sawtooth signal generator 131 to the latch output data from the latch 137, and the addition output is latched for cumulatively adding the sawtooth signal data $y_{SW}$. The subtractor 139 subtracts sawtooth signal data $y_{SW}/2$, supplied via the ½ multiplier 138, from the latch output data of the latch 137 (that is, the cumulative sum data of the sawtooth signal data $y_{SW}$) to form parabolic signal data represent by the equation $y_{pb}$ $$y_{pb} = \sum_{i=0}^{x} \frac{i}{a} - \frac{i}{2a} = \frac{1}{2a} X^2. \quad (16)$$

The parabolic signal data $y_{pb}$ generated by the integrating circuit 132 are supplied to the subtraction circuit 133, where the value n/3a is subtracted from the data $y_{pb}$. Thus, parabolic signal data $y_{pbo}$ freed of d c components, as represented by the equation $$y_{pbo} = \frac{1}{2a} X^2 - \frac{n}{3a}. \quad (17)$$

and as shown by a curved line in FIG. 12, are outputted. (More precisely, two such parabolic signals are shown in FIG. 12, namely one for a=1, represented by a full curved line, and one for a=2, represented by a dashed curved line.)

The symbol n used in the above equations represents the total number of pixels per scanning line and the total number of scanning lines per frame, according to whether the sawtooth signal for the horizontal scanning period or the sawtooth signal for the vertical scanning period, respectively, are being formed.

The sawtooth signal data $y_{SWO}$ and the parabolic signal data $y_{pbo}$, formed by the sawtooth signal generator and the parabolic signal generator of digital circuit configuration, respectively, may be summed together to provide a digital dark current correction signal or signals. That digital dark current correction signal or signals may be converted by digital to analog converting means into a corresponding analog signal or signals and supplied to the correction circuit 103.

The correction circuit 103 may if desired be designed to have a digital configuration and be provided downstream of the A/D converter 105 to perform the dark current correction in a digital fashion, though this involves a complicated processing operation in the vicinity of the knee point in the preknee processing operation. In addition, the circuit is increased in size as regards black dark current correction because a subtraction operation needs to be performed after the dark current correction signal is multiplied by a gain after gain switching on the analog side.

In the present embodiment, the shading correction signal forming section 110 checks whether the dark current correction error in the dark current corrected imaging output data for the dark current correction mode is not more than a predetermined value stored in the memory 113. If the dark current correction error is larger than the predetermined value, the signal forming section 110 causes the gains of the iris control circuit 108 and the preamplifier 102 to be changed to reduce the error and, using these changed (renewed) gains, repeats the operation of the dark current detecting mode to store coefficient data which will give a correction error not larger than the predetermined value. In this way, the imaging signal from the imaging device 101 may be subjected to optimum dark current correcting processing.

With the above-described dark current correction apparatus embodying the invention, black and/or white, dark current characteristics may be detected by digital processing of imaging output signals obtained from an imaging device comprising an array of a large number of pixels in a matrix configuration with no light falling on the imaging device and with light of uniform light intensity incident on all of an imaging surface of the imaging device, according to which sawtooth signals and parabolic signals having the levels necessary for dark current correction may be formed automatically. By sampling imaging output signal level data of the pixels of the imaging device at a predetermined interval in both the vertical and horizontal directions, dark current characteristics of the imaging output signal of the imaging device may be detected on the basis of first and second data strings each having a reduced data amount or volume, so that the dark current characteristics may be detected using a memory of a reduced storage capacity.

Thus, in accordance with the present embodiment, which provides a dark current correcting apparatus in which an imaging output signal from the imaging device is subjected to dark current correcting processing by means of sawtooth signals from sawtooth signal generators and parabolic signals from parabolic signals generators, satisfactory dark current correction may be performed quickly and reliably by a simple circuit.

References in the foregoing description and in the appended claims to a dark current signal component being eliminated from an output signal of an image pick-up device (imaging device) are to be construed as covering both complete and partial elimination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A dark current correction apparatus for eliminating a dark current signal component from an output signal of an image pick-up device having a plurality of pixels, the apparatus comprising:
exposure control means for controlling an exposure level of said image pick-up device;
analog to digital converting means for converting an output signal of said image pick-up device into a digital video signal;
memory means for memorizing level data of said digital video signal outputted from pixels of said image pick-up device while said exposure control means is operative to control said exposure level to be at zero level;
dark current correction signal generating means for generating a dark correction signal according to data read out from said memory means; and
signal processing means for processing an output signal produced by said image pick-up device while said image pick-up device is exposed to pick up an image, according to said dark current correction signal, so that said dark current signal component is eliminated from said output signal produced by said image pick-up device while said image pick-up device is exposed to pick up an image wherein a dark current correction apparatus for eliminating a dark current signal component from an output signal of an image pick-up device having a plurality of pixels, the apparatus comprising:
exposure control means for controlling an exposure level of said image pick-up device;
analog to digital converting means for converting an output signal of said image pick-up device into a digital video signal;
memory means for memorizing level data of said digital video signal outputted from predetermined ones of said pixels of said image pick-up device while said exposure control means is operative to control said exposure level to be at zero level;
dark current correction signal generating means for generating a dark current correction signal according to data read out from said memory means; and
signal processing means for processing an output signal produced by said image pick-up device while said image pick-up device is exposed to pick up an image, according to said dark current correction signal, so that said dark current signal component is eliminated from said output signal produced by said image pick up device while said image pick-up device is exposed to pick up an image, and wherein said memory means is operative to memorize level data at predetermined periods adjacent to periods in which dark current correction data are memorized in said memory means, the level of said level data being the same as the levels of said digital video signal just after blanking intervals of said digital video signal.

2. Apparatus according to claim 1, wherein said signal processing means comprises subtracting means for subtracting said dark current correction signal from said output signal produced by said image pick-up device while said image pick-up device is exposed to pick up an image.

3. A dark current correction apparatus for eliminating a dark current signal component from an output signal of an image pick-up device having a plurality of pixels, the apparatus comprising:
exposure control means for controlling an exposure level of said image pick-up device;
analog to digital converting means for converting an output signal of said image pick-up device into a digital video signal;
memory means for memorizing level data of said digital video signal outputted from pixels of said image pick-up device while said exposure control means is operative to control said exposure level to be at zero level;
dark current correction signal generating means for generating a dark correction signal according to data read out from said memory means; and
signal processing means for processing an output signal produced by said image pick-up device while said image pick-up device is exposed to pick up an image, according to said dark current correction signal, so that said dark current signal component is eliminated from said output signal produced by said image pick-up device while said image pick-up device is exposed to pick up an image, wherein a dark current correction apparatus for eliminating a dark current signal component from an output signal of an image pick-up device having a plurality of pixels, the apparatus comprising:

exposure control means for controlling an exposure level of said image pick-up device;

analog to digital converting means for converting an output signal of said image pick-up device into a digital video signal;

memory means for memorizing level data of said digital video signal outputted from predetermined ones of said pixels of said image pick-up device while said exposure control means is operative to control said exposure level to be at zero level;

dark current correction signal generating means for generating a dark current correction signal according to data read out from said memory means; and signal processing means for processing an output signal produced by said image pick-up device while said image pick-up device is exposed to pick up an image, according to said dark current correction signal, so that said dark current signal component is eliminated from said output signal produced by said image pick up device while said image pick-up device is exposed to pick up an image, and wherein said dark current correction signal generating means is operative repeatedly to read out the leading data in each line from said memory means during predetermined periods of blanking intervals of said digital video signal.

4. A dark current correction apparatus for eliminating a dark current signal component from an output signal of an image pick-up device having a plurality of pixels, the apparatus comprising:

exposure control means for controlling an exposure level of said image pick-up device;

analog to digital converting means for converting an output signal of said image pick-up device into a digital video signal;

memory means for memorizing level data of said digital video signal outputted from pixels of said image pick-up device while said exposure control means is operative to control said exposure level to be at zero level;

dark current correction signal generating means for generating a dark correction signal according to data read out from said memory means; and signal processing means for processing an output signal produced by said image pick-up device while said image pick-up device is exposed to pick up an image, according to said dark current correction signal, so that said dark current signal component is eliminated from said output signal produced by said image pick-up device while said image pick-up device is exposed to pick up an image, wherein a dark current correction apparatus for eliminating a dark current signal component from an output signal of an image pick-up device having a plurality of pixels, the apparatus comprising:

exposure control means for controlling an exposure level of said image pick-up device;

analog to digital converting means for converting an output signal of said image pick-up device into a digital video signal;

memory means for memorizing level data of said digital video signal outputted from predetermined ones of said pixels of said image pick-up device while said exposure control means is operative to control said exposure level to be at zero level;

dark current correction signal generating means for generating a dark current correction signal according to data read out from said memory means; and signal processing means for processing an output signal produced by said image pick-up device while said image pick-up device is exposed to pick up an image, according to said dark current correction signal, so that said dark current signal component is eliminated from said output signal produced by said image pick up device while said image pick-up device is exposed to pick up an image, wherein said dark current correction signal generating means comprises:

interpolating means for interpolating data read out from said memory means;

digital to analog converting means for converting an output signal of said interpolating means into an analog signal; and low-pass filter means connected to an output of said digital to analog converting means for outputting said dark current correction signal.

5. A defective pixel correction apparatus for eliminating a defective pixel signal component from an output signal of an image pick-up device having a plurality of pixels, the apparatus comprising:

exposure control means for controlling an exposure level of said image pick-up device;

analog to digital converting means for converting an output signal of said image pick-up device into a digital video signal;

memory means for memorizing level data of said digital video signal outputted from predetermined ones of said pixels of said image pick-up device while said exposure control means is operative to control said exposure level such that said image pick-up device is uniformly exposed;

defective pixel correction signal generating means for generating a defective pixel correction signal according to data read out from said memory means;

signal processing means for processing an output signal produced by said image pick-up device while said image pick-up device is exposed to pick up an image, according to said defective pixel correction signal, so that said defective pixel signal component is eliminated from said output signal produced by said image pick-up device while said image pick-up device is exposed to pick up an image, and wherein said memory means is operative to memorize level data at predetermined periods adjacent to periods in which defective pixel correction data are memorized in said memory means, the level of said level data being the same as the levels of said digital video signal just after blanking intervals of said digital video signal.

6. Apparatus according to claim 5, wherein said signal processing means comprises dividing means for dividing said output signal, produced by said image pick-up device while said image pick-up device is exposed to pick up an image, by said defective pixel correction signal.

7. A defective pixel correction apparatus for eliminating a defective pixel signal component from an output signal of an image pick-up device having a plurality of pixels, the apparatus comprising:

exposure control means for controlling an exposure level of said image pick-up device;

analog to digital converting means for converting an output signal of said image pick-up device into a digital video signal;

memory means for memorizing level data of said digital video signal outputted from predetermined ones of said pixels of said image pick-up device while said exposure control means is operative to control said exposure level such that said image pick-up device is uniformly exposed;

defective pixel correction signal generating means for generating a defective pixel correction signal according to data read out from said memory means;

signal processing means for processing an output signal produced by said image pick-up device while said image pick-up device is exposed to pick up an image, according to said defective pixel correction signal, so that said defective pixel signal component is eliminated from said output signal produced by said image pick-up device while said image pick-up device is exposed to pick up an image, and wherein said defective pixel correction signal generating means is operative repeatedly to read out the leading data in each line from said memory means during predetermined periods of blanking intervals of said digital video signal.

8. A defective pixel correction apparatus for eliminating a defective pixel signal component from an output signal of an image pick-up device having a plurality of pixels, the apparatus comprising:

exposure control means for controlling an exposure level of said image pick-up device;

analog to digital converting means for converting an output signal of said image pick-up device into a digital video signal;

memory means for memorizing level data of said digital video signal outputted from predetermined ones of said pixels of said image pick-up device while said exposure control means in operative to control said exposure level such that said image pick-up device is uniformly exposed;

defective pixel correction signal generating means for generating a defective pixel correction signal according to data read out from said memory means;

signal processing means for processing an output signal produced by said image pick-up device while said image pick-up device is exposed to pick up an image, according to said defective pixel correction signal, so that said defective pixel signal component is eliminated from said output signal produced by said image pick-up device while said image pick-up device is exposed to pick up an image, wherein said defective pixel correction signal generating means comprises:

interpolating means for interpolating data read out from said memory means;

digital to analog converting means for converting an output signal of said interpolating means into an analog signal; and low-pass filter means connected to an output of said digital to analog converting means for outputting said defective pixel correction signal.

9. A dark current correction apparatus for eliminating a dark current signal component from an output signal of an image pick-up device having a plurality of pixels, the apparatus comprising:

exposure control means for controlling an exposure level of said image pick-up device;

analog to digital converting means for converting an output signal of said image pick-up device into a digital video signal;

sampling means for sampling said digital video signal in vertical and horizontal directions at predetermined intervals while said exposure control means is operative to control said exposure level to be at zero level;

quadratic curve generating means for generating first and second quadratic curves according to said digital video signal as sampled in the vertical and horizontal directions;

sawtooth signal generating means for generating a sawtooth signal;

parabolic signal generating means for generating a parabolic signal;

first level control means for controlling the level of said sawtooth signal according to coefficients of a second order term of said first and second quadratic curves;

second level control means for controlling the level of said parabolic signal according to coefficients of a first order term of said first and second quadratic curves; and signal processing means for processing an output signal produced by said image pick-up device while said image pick-up device is exposed to pick up an image, according to output signals of said first and second level control means, so that said dark current signal component is eliminated from said output signal produced by said image pick-up device while said image pick-up device is exposed to pick up an image.

10. A defective pixel correction apparatus for eliminating a defective pixel signal component from an output signal of an image pick-up device having a plurality of pixels, the apparatus comprising:

exposure control means for controlling an exposure level of said image pick-up device;

analog to digital converting means for converting an output signal of said image pick-up device into a digital video signal;

sampling means for sampling said digital video signal in vertical and horizontal directions at predetermined intervals while said exposure control means is operative to control said exposure level such that said image pick-up device is uniformly exposed;

quadratic curve generating means for generating first and second quadratic curves according to said digital video signal as sampled in the vertical and horizontal directions;

sawtooth signal generating means for generating a sawtooth signal;

parabolic signal generating means for generating a parabolic signal;

first level control means for controlling the level of said sawtooth signal according to coefficients of a second order term of said first and second quadratic curves;

second level control means for controlling the level of said parabolic signal according to coefficients of a first order term of said first and second quadratic curves; and signal processing means for processing an output signal produced by said image pick-up device while said image pick-up device is exposed to pick up an image, according to output signals of said first and second level control means, so that said defective pixel signal component is eliminated from said output signal produced by said image pick-up device while said image pick-up device is exposed to pick up an image.

* * * * *